US012479230B2

(12) United States Patent
Mahler et al.

(10) Patent No.: US 12,479,230 B2
(45) Date of Patent: Nov. 25, 2025

(54) SORTING DEVICE FOR SORTING BOOK BLOCKS

(71) Applicant: HUNKELER AG, Wikon (CH)

(72) Inventors: Erwin Mahler, Geuensee (CH); Patrick Faes, Zofingen (CH)

(73) Assignee: HUNKELER AG, Wikon (CH)

( * ) Notice: Subject to any disclaimer, the term of this patent is extended or adjusted under 35 U.S.C. 154(b) by 0 days.

(21) Appl. No.: 18/704,518

(22) PCT Filed: Oct. 25, 2022

(86) PCT No.: PCT/EP2022/079831
§ 371 (c)(1),
(2) Date: Apr. 25, 2024

(87) PCT Pub. No.: WO2023/072960
PCT Pub. Date: May 4, 2023

(65) Prior Publication Data

US 2025/0229561 A1 Jul. 17, 2025

(30) Foreign Application Priority Data

Oct. 25, 2021 (CH) .......................... CH070444/2021

(51) Int. Cl.
*B42C 19/08* (2006.01)
*B65H 5/00* (2006.01)

(52) U.S. Cl.
CPC ............... *B42C 19/08* (2013.01); *B65H 5/00* (2013.01)

(58) Field of Classification Search
CPC .................................. B42C 19/08; B65H 5/00
USPC ................................ 412/1, 9, 11, 14, 18, 25
See application file for complete search history.

(56) References Cited

U.S. PATENT DOCUMENTS

2011/0079159 A1* 4/2011 Silberbauer ............. B42C 19/02
101/483

* cited by examiner

*Primary Examiner* — Justin V Lewis
(74) *Attorney, Agent, or Firm* — Oliff PLC

(57) ABSTRACT

A sorting device for sorting book blocks is described, the sorting device having a filling station for sorting one or more book blocks into receptacles, a first input conveyor configured to feed book blocks to the filling station, a second input conveyor configured to feed empty receptacles to the filling station, a first output conveyor configured to transfer full receptacles away from the filling station, the filling station comprising a plurality of inserting devices configured to insert the one or more book blocks into the receptacles, wherein the sorting device further includes a control device configured to receive sorting information of the one or more book blocks and to control the inserting devices to sort the one or more book blocks into the receptacles using the sorting information.

29 Claims, 12 Drawing Sheets

SORTING DEVICE FOR SORTING BOOK BLOCKS

FIELD OF THE INVENTION

The present invention relates to a sorting device for sorting book blocks, a method of operating a sorting device and a control device for controlling a sorting device.

BACKGROUND OF THE INVENTION

Book blocks comprising stacks of printed sheets are typically manufactured in book production lines where different processing steps like printing, cutting, folding, gluing, stacking, aligning etc. may be executed. At the end of the book production line where the pre-glued book blocks arrive on a conveyor, an operator usually retrieves the book blocks manually for further processing, such as passing to a book binder for applying a cover to the book blocks. An operator may execute several manual tasks, including e.g. sorting the arriving book blocks in categories of covers to be applied to the book blocks, of different paper types, grammages, formats etc.

Books are for example manufactured in book production lines with digital printing on a continuous paper strip, with the book production line comprising an unwinding and printing station and other kinematic components including a perforating and cutting station, a dynamic signature forming station and a collecting and pre-assembling station. At the end of the book production line, there is typically provided a conveyor belt, from which an operator can extract stabilized book blocks for manual treatments, or access to a book binder where the book block is bound to a cover.

SUMMARY OF THE INVENTION

In the course of optimizing book production, it is desired to increase the number of automized steps. Certain steps, however, are commonly performed manually despite the inefficiency and inaccuracy involved with the manual actions in production. As mentioned, sorting of book blocks at the end of a book production line is for example commonly performed manually, as automation of this step is not straightforward in view of the variety of book blocks being produced for different orders and categories in further processing, such as for example applying the correct cover to a respective book block.

It is therefore an object of the invention to provide a sorting device for sorting book blocks, a method for operating a sorting device and a control device for a sorting device which at least partially improves the prior art and avoids at least part of the disadvantages of the prior art.

According to the present invention, this object is achieved by the features of the independent claims. In addition, further advantageous embodiments follow from the dependent claims and the description as well as the figures.

According to an aspect of the invention, this object is particularly achieved by a sorting device for sorting book blocks, the sorting device comprising a filling station for sorting one or more book blocks into receptacles, a first input conveyor configured to feed book blocks to the filling station, a second input conveyor configured to feed empty receptacles to the filling station, a first output conveyor configured to transfer full receptacles with one or more sorted book blocks away from the filling station, the filling station comprising a plurality of inserting devices configured to insert the one or more book blocks into the receptacles, wherein the sorting device further comprises a control device configured to receive sorting information of the one or more book blocks and to control the inserting devices to sort the one or more book blocks into the receptacles using the sorting information.

The control device may in particular receive sorting information for each book block to be sorted. The sorting information may therefore be a book block specific sorting information. Due to the control device being configured to receive the sorting information and to control the inserting devices to sort the one or more book blocks into the receptacles, the sorting process can be automized and manual sorting of the book blocks can be avoided. In particular, the control device may use the sorting information to decide which inserting device is to be controlled such that the respective book block the sorting information belongs to may be inserted into a correct target receptacle. The sorting device may therefore execute the following steps for each unsorted book block arriving by the first input conveyor: receiving of sorting information by the control device; deciding by the control device which inserting device and/or target receptacle, respectively, is to be controlled according to the sorting information of the respective book block; controlling by the control device the chosen inserting device to insert the respective book block in to the target receptacle using the inserting device.

Preferably, the sorting device comprises at least one book block reader configured to read sorting information from at least one identification tag of a book block, wherein the control device is configured to receive the sorting information from the at least one book block reader.

The at least one book block reader is preferably arranged at the first input conveyor and may read the sorting information of the unsorted book blocks passing the at least one book block reader by the first input conveyor. The at least one book block reader may be for example a data matrix code reader, QR code reader, a bar code reader, a RFID reader etc. The at least one identification tag of a book block may accordingly be for example a data matrix code, QR code, a bar code, a RFID tag etc. The at least one book block reader may be connected with the control device by a wired or wireless connection.

Alternatively or additionally, the sorting information may be received by the control device from an upstream process, for example from an upstream printing system.

With at least one book block reader, the sorting device may therefore execute the following steps for each unsorted book block arriving by the first input conveyor: reading of sorting information by the book block reader; transmitting the sorting information from the at least one book block reader to the control device; deciding by the control device which inserting device and/or target receptacle, respectively, is to be controlled according to the sorting information of the respective book block; controlling by the control device the chosen inserting device to insert the respective book block in to the target receptacle using the inserting device.

The at least one book block reader is preferably configured to read further information from the at least one identification tag of a book block, in particular book block identification information, and to transmit the book block identification information to the control device. Reading book block identification information from the at least one identification tag advantageously allows to identify and track individual book blocks in the sorting process.

The control device may in particular comprise a computer configured to receive sorting information from the at least one book block reader and to control the inserting devices.

The control device may be connected with the inserting devices by a wired or wireless connection.

While the sorting device is presently described for sorting book blocks according to the present disclosure, the person skilled in the art recognizes that the sorting device according to the present disclosure may also be used to sort book covers.

In some embodiments, the control device comprises a memory having stored thereon a sorting category schedule with sorting categories each defining matching sorting information, wherein each of the inserting devices is assigned at least one sorting category, wherein the control device is configured to select an inserting device with an assigned sorting category to which the sorting information of a book block matches and to control the selected inserting device to sort the book block into a receptacle.

The sorting categories may comprise one or more book cover sorting categories such as for example hard/soft, matt/glossy etc., one or more paper type categories, one or more grammage categories, one or more format categories, and/or other categories. The control device may assign each of the inserting devices at least one sorting category, such that a receptacle filled by a particular inserting device can be filled with one or more book blocks for a respective sorting category. For example, receptacles at an inserting device with an assigned sorting category "hard cover" may be filled with book blocks which are required to be furnished with a hard cover. This can be achieved by the sorting categories defining matching sorting information readable from the identification tag by the book block reader. The matching sorting information may for example be an entry in a particular field of the identification tag, such as for example of a data matrix code, QR code, bar code etc.

For example, the sorting category "hard cover" assigned to a particular sorting device may define a matching sorting information to be a field entry of the number "3" representing book blocks which are to be furnished by a hard cover. If the book block reader reads the identification tag of a book block arriving by the first input conveyor and transmits to the control device the sorting information that the field entry of the identification tag is "3", the control device may check the sorting category schedule to find the sorting category "hard cover" having defined the entry "3" as a matching sorting information. The control device may then select the inserting device being assigned the sorting category "hard cover" and control said inserting device such that the respective book block is inserted into the receptacle being filled by said inserting device.

Sorting according to further categories such as for example paper type categories, grammage categories, format categories etc. may be executed accordingly.

In some embodiments, the sorting category schedule comprises, preferably two, particularly preferably four, book cover sorting categories for sorting the one or more book blocks according to book covers for the one or more book blocks.

An inserting device may be assigned by more than one sorting category, e.g. book cover sorting category. For example, an inserting device may be assigned the book cover categories "glossy" and "hard cover". Accordingly, the control device may select said inserting device if a book block with matching sorting information for "glossy" and "hard cover" is read by the book block reader and may control said inserting device to insert said book block into the respective receptacle.

The inserting devices may be assigned different combinations of sorting categories. For example, a sorting category schedule having four book cover sorting categories, such as for example: hard, soft, matt, glossy, may give rise to the following four different assignments of inserting devices: hard/matt; hard/glossy; soft/matt; soft/glossy. Alternatively, said sorting category schedule may give rise to only two different assignments of inserting devices, for example if the book blocks are required to be sorted only depending on hard or soft cover to be applied. Other combinations, for example a book cover sorting category and a paper type category, may also be possible.

In some embodiments, the first input conveyor, the second input conveyor and the first output conveyor are arranged in parallel.

Arranging the first input conveyor, the second input conveyor and the first output conveyor in parallel provides the advantage that the sorting device can be designed in a compact fashion.

In some embodiments, at least two of the first input conveyor, the second input conveyor and the first output conveyor are arranged perpendicular to one another. For example, the first input conveyor and the first output conveyor may be arranged perpendicular to one another.

Depending on the spatial requirements of installation of the sorting device and/or a book production system comprising the sorting device, a perpendicular arrangement may be advantageous. Further, by arranging at least two of the first input conveyor, the second input conveyor and the first output conveyor perpendicular to one another, especially the first input conveyor and the first output conveyor, it may be possible to sort one or more book blocks into the receptacles with the spine ahead without the need of a rotating device.

In some embodiments, one or more of the first input conveyor, the second input conveyor, the first output conveyor comprises a belt conveyor and/or a roller conveyor and/or a gripper conveyor.

In some embodiments, the first input conveyor comprises a roller conveyor and a band conveyor. The roller conveyor may be arranged downstream to the band conveyor with respect to the conveying direction of the first input conveyor.

In some embodiments, the first input conveyor comprises a first roller conveyor and a second roller conveyor. The first roller conveyor may be arranged downstream to the second roller conveyor with respect to the conveying direction of the first input conveyor. The second roller conveyor may comprise a plurality of slanted cylindrical rollers. The cylindrical rollers may be slanted in a fashion that book blocks conveyed on the second roller conveyor may be conveyed towards a rotating device, in particular towards a guiding plate of the rotating device.

In some embodiments, the book block reader is configured to read pre-sorting information from at least one identification tag of the book blocks. The sorting information may thus comprise pre-sorting information. The pre-sorting information may comprise identification information of quality book blocks for quality inspection or of test book blocks. The pre-sorting information may alternatively or additionally comprise identification information of incomplete book blocks.

In some embodiments, a first output tray is arranged at a first side of the first input conveyor, in particular of the roller conveyor of the first input conveyor or the first roller conveyor of the first input conveyor. The first input conveyor may be configured to convey quality book blocks and/or test book blocks to the first output tray.

In some embodiments, a second output tray is arranged at a second side of the first input conveyor, in particular of the roller conveyor of the first input conveyor or the first roller conveyor of the first input conveyor. The first input conveyor may be configured to convey incomplete book blocks to the second output tray.

The first input conveyor may be controlled by the control device which is configured to receive pre-sorting information from the book block reader to control the first input conveyor to convey a book block depending on the pre-sorting information received. In particular, the control device may control the first input conveyor to convey a book block to the filling station, to the first output tray or the second output tray, depending on the pre-sorting information received.

In some embodiments, the control device is configured to control the first input conveyor and/or the first output conveyor and/or the second input conveyor such that the time to sort a book block fed from the first input conveyor into a receptacle is longer than the time to transfer a full receptacle away from the filling station by the first output conveyor and to replace the full receptacle by an empty receptacle.

The time to sort a book block fed from the first input conveyor into a receptacle may be controlled by the control device by controlling the conveying speed of the first input conveyor and/or the inserting speed of one or more of the inserting devices. The time to transfer a full receptacle away from the filling station by the first output conveyor and to replace the full receptacle by an empty receptacle may be controlled by the control device by controlling the moment when a full receptacle is output from the filling station to the first output conveyor and/or the conveying speed of the first output conveyor and/or the conveying speed of the second input conveyor.

By controlling the time to sort a book block fed from the first input conveyor into a receptacle to be longer than the time to transfer a full receptacle away from the filling station by the first output conveyor and to replace the full receptacle by an empty receptacle, the receptacles are prevented from being overrun by incoming book blocks, in particular during a change of receptacles where full receptacles are replaced by empty receptacles.

In some embodiments, the filling station comprises a plurality of filling sites, preferably arranged in a row, particularly preferably along a conveying direction of the first input conveyor, wherein each of the filling sites is arranged at an inserting device and configured to position a receptacle at the filling site such that one or more book blocks are insertable by the respective inserting device into the receptacle positioned at the filling site.

An unsorted book block can therefore be conveyed along the conveying direction of the first input conveyor until it arrives at an inserting device for which its sorting information matches the sorting category assigned to said inserting device. Said inserting device may then insert the book block into a receptacle positioned at the filling site of said inserting device. Arranging of the filling sites along the conveying direction of the first input conveyor therefore allows for an optimal utilization of the available space and reducing complexity in sorting of the one or more book blocks into receptacles using the plurality of inserting devices.

In some embodiments, the filling station comprises a plurality of waiting sites, preferably arranged in a row, particularly preferably along a conveying direction of the second input conveyor, configured to position each an empty receptacle received from the second input conveyor, wherein each of the plurality of waiting sites is arranged upstream to a filling site such that an empty receptacle is movable from a waiting site to a filling site if the filling site is unoccupied.

The plurality of waiting sites provide the advantage that empty receptacles can be kept ready to efficiently replace full receptacles which are conveyed away by the first output conveyor. The plurality of waiting sites may therefore function as buffer sites to buffer empty receptacles arriving by the second input conveyor. The waiting sites and filling sites may advantageously be used to optimize synchronization of receptacles conveyance and book block conveyance by adjusting waiting times at the waiting sites and/or movement of receptacles from the waiting sites to the filling sites and/or output times of receptacles from the filling sites to the first output conveyor.

In some embodiments, the second input conveyor comprises a plurality of pre-waiting sites arranged upstream to the waiting sites of the filling station. The pre-waiting sites may advantageously serve to maintain a gapless supply of empty receptacles. One or more sensors may be arranged at the pre-waiting sites and configured to notify an operator or the control device if one or more of the pre-waiting sites are unoccupied.

In some embodiments, the filling station comprises a plurality of first receptacle drives configured to convey empty receptacles independently from each of the waiting sites to the filling sites.

The first receptacle drives are preferably configured to convey the empty receptacles from the waiting sites to the filling sites in a direction perpendicular to the conveying direction of the first input conveyor and/or the second input conveyor and/or the first output conveyor.

In some embodiments, the filling station comprises a plurality of second receptacle drives configured to convey full receptacles independently from each of the filling sites to the first output conveyor.

The second receptacle drives are preferably configured to convey the full receptacles from the filling sites to the first output conveyor in a direction perpendicular to the conveying direction of the first input conveyor and/or the second input conveyor and/or the first output conveyor.

The first and/or second receptacle drives may comprise belt drives configured to drive one or more belts at the waiting sites and/or the filling sites configured to convey the empty receptacles and/or full receptacles.

The waiting sites and/or the filling sites may comprise one or more height changing devices configured to raise the receptacles at the waiting sites and/or the filling sites, in particular above a level of a conveying plane of the second input conveyor and/or the first output conveyor. By raising the receptacles at the waiting sites and/or the filling sites, in particular above a level of a conveying plane of the second input conveyor and/or the first output conveyor, a receptacle at a waiting site can be conveyed to a filling site and/or a receptacle can be conveyed from the filling site to the first output conveyor. While inserting one or more book blocks to a receptacle, the one or more height changing devices may lower the receptacles to the level of the second input conveyor and/or the first output conveyor. In some embodiments, the one or more height changing devices may raise and lower the one or more receptacle drives. For example, the one or more height changing devices may raise and lower the one or more belt drives, such that the one or more belts may be raised above a level of the second input conveyor and/or the first output conveyor and lowered to or below the level of the second input conveyor and/or the first output conveyor.

In some embodiments, the one or more height changing devices may raise the receptacles above a level of a conveying plane of the second input conveyor and/or the first output conveyor for positioning of a receptacle at a waiting site and/or at a filling site and/or for inserting one or more book blocks into a receptacle. Transferring of a receptacle from a waiting site to a filling site and/or from a filling site to the first output conveyor may also occur at a raised level. The one or more receptacle drives may then be stopped for inserting one or more book blocks into a receptacle and be driven for transferring of the receptacle.

In some embodiments, the control device is configured to control the first and second receptacle drives such that conveying of a full receptacle from a filling site to the first output conveyor and conveying of an empty receptacle from a waiting site to a filling site is synchronized.

In particular, conveying of a full receptacle from a filling site to the first output conveyor and conveying of an empty receptacle from a waiting site to a filling site may occur simultaneously.

In some embodiments, the filling station comprises a plurality of combined receptacle drives for each of the waiting sites and/or the filling sites, configured to convey empty receptacles from each of the waiting sites to a respective downstream filling site and to convey full receptacles from each of the filling sites to the first output conveyor.

The combined receptacle drive may in particular convey a full receptacle from a filling site to the first output conveyor and an empty receptacle from a waiting site to the filling site simultaneously.

A combined receptacle drive may therefore combine the functionality of a first receptacle drive and a second receptacle drive.

In some embodiments, the filling station comprises a plurality of pivotable lifting plates each arranged at the filling sites and each configured to pivot to form a slope for a receptacle positioned at the respective filling site.

Due to the slope formed by pivoting the lifting plate, a book block being deposited into the receptacle can be guided to be aligned to and advantageously abutting the front wall of the receptacle at the filling site. The lifting plate may be pivoted by using a drive with an eccentric. In particular for high rates of deposition, book blocks may tend to bounce back from the front wall of the receptacle. By using the lifting plate, the effects of the bouncing back can be mitigated such that proper alignment of the book blocks in the receptacle can be achieved even for high rates of deposition. After filling of the receptacle, the lifting plate can be pivoted back, and the receptacle be conveyed from the filling site to the first output conveyor by using the combined receptacle drive.

In some embodiments, the inserting devices each comprise a deflector controlled by the control device and configured to deflect one or more book blocks from a conveying direction of the first input conveyor to a respective inserting device, wherein the deflectors are preferably arranged along a feeding section of the filling station arranged downstream of the first input conveyor.

The control device may therefore select a deflector of an inserting device with an assigned sorting category to which the sorting information of a book block matches and control the deflector to deflect the book block from the conveying direction of the first input conveyor to said inserting device.

In some embodiments, the feeding section may comprise a feeding conveyor adjoining the first input conveyor and configured to convey one or more undeflected book blocks along a primary conveying direction parallel to the conveying direction of the first input conveyor. The deflectors may be arranged on or at the feeding conveyor.

In some embodiments, the feeding section comprises one or more book block waiting sites. The one or more book block waiting sites may be used to temporarily buffer one or more book blocks arriving from the first input conveyor. The one or more book blocks may be arranged at the feeding conveyor.

In some embodiments, the deflectors comprise a plurality of rollers controlled by the control device and individually rotatable around a first axis perpendicular to a conveying direction and parallel to a conveying plane of the first input conveyor for conveying the book blocks in the conveying direction and individually rotatable around a second axis perpendicular to the conveying direction and perpendicular to the conveying plane of the first input conveyor for deflecting one or more book blocks from the conveying direction.

The plurality of rollers may therefore operate as gates to deflect the book blocks from the conveying direction. Other embodiments of deflectors such as for example switchable gates are also conceivable.

The plurality of rollers provides the advantage of high adaptability and flexibility, as the position where the book blocks are deflected can be varied along the feeding section by controlling the respective rollers at a desired position to deflect a book block.

The plurality of rollers furthermore provides the advantage that the plurality of rollers can perform both the function of conveying and deflecting of the book blocks.

In some embodiments, the filling sites are arranged between the deflectors and the first output conveyor and a portion of the second input conveyor is preferably arranged below the feeding section.

In particular, the waiting sites may be arranged at least partially below the feeding section. By arranging a portion of the second input conveyor and/or the waiting sites at least partially below the feeding section a compact design of the filling station can be achieved. The filling sites may be arranged on a level corresponding to the level of the first output conveyor. The filling sites may therefore be arranged between the deflectors and the first output conveyor, but on a different level than the deflectors, such that the one or more book blocks may be sorted downwards from the deflectors to the receptacles positioned at the filling sites.

In some embodiments, the sorting device comprises light barriers arranged at the deflectors and configured to transmit an occupancy signal to the control device if a book block is present at a respective deflector.

Due to occupancy signal from the light barriers, false actuations of a deflector in the absence of a book block can be prevented.

Additionally or alternatively, one or more light barriers may be arranged at different sections of the sorting device, for example at a downstream portion of the first input conveyor, at downstream portion of the second input conveyor, at input portions of the filling station for book blocks and/or receptacles, at the feeding section, at one or more inserting devices and/or at an upstream portion of the first output conveyor. The one or more light barriers may be configured to transmit an occupancy signal to the control device if a book block and/or a receptacle is present at the respective light barrier.

In some embodiments, the inserting devices each comprise a transfer device, preferably comprising a slide, configured to transfer one or more deflected book blocks from the deflector to the respective receptacle.

The transfer devices can advantageously serve to bridge a gap between the deflectors and the receptacles. The transfer devices therefore allow for an increased flexibility in filling station design, for example the arrangement of the filling sites and the feeding section with respect to one another. For embodiments where the filling sites are arranged at a lower level than the feeding conveyor and/or the deflectors, the one or more book blocks can be inserted into the receptacles by the slides. In some embodiments, the slides comprise a sliding surface on which the one or more book blocks may slide. In some embodiments, the slides comprise rollers or one or more belts by which the one or more book blocks may be conveyed.

In some embodiments, the transfer devices each comprise an end portion which is at least partially placeable in an interior space of the receptacle and retractable therefrom.

By placing an end portion of the transfer devices at least partially in an interior space of the receptacle, the one or more book blocks can smoothly be inserted into the receptacles, reducing the probability of damaging the one or more book blocks.

The end portions of the transfer devices may be pivotable and/or telescopable for being placeable in an interior space of the receptacle and being retractable therefrom.

In some embodiments, the final height of the end portions of the transfer devices when placed in the interior space of the receptacle may be changeable.

By changing the final height of the end portions when placed in the interior space of the receptacle, the height of one or more book blocks already present in the receptacle can be taken into account when inserting one or more book blocks into the receptacle.

In some embodiments, the filling station comprises a plurality of ejecting devices, preferably in the form of one or more receptacle drives, controlled by the control device and configured to transfer full receptacles to the first output conveyor.

In particular, the ejecting devices may comprise the second receptacle drives or the combined receptacle drives described above.

In some embodiments, the control device comprises a memory having stored thereon at least one maximum criterion for sorted one or more book blocks in the receptacles, wherein the control device is configured to determine a receptacle to be a full receptacle and to control the ejecting devices to transfer the receptacle to the first output conveyor, if the sorted one or more book blocks in the receptacle satisfy one or more of the at least one maximum criterion.

The at least one maximum criterion may therefore provide a definition of a full receptacle. In particular, a full receptacle does not necessarily have to be spatially filled by book blocks up to a top edge of the receptacle. Depending on the maximum criterion used, a receptacle with one, two etc. book blocks may also be a full receptacle.

By using the at least one maximum criterion, overfilling of the receptacles can be prevented. As the control device controls the filling state of the receptacles by using the at least one maximum criterion, manual monitoring of the filling states of the receptacles is advantageously not required. The at least one maximum criterion can be determined and stored in the memory of the control device in a flexible and modifiable manner. Further, several maximum criteria can be combined with each other, for example in a cumulative or alternative or a specific hierarchical manner.

The at least one maximum criterion may in particular comprise one or more of: a maximum number of one or more sorted book blocks in a receptacle; a maximum height of a stack formed by the one or more sorted book blocks in a receptacle, as measured by a height sensor of the sorting device; maximum height of a stack formed by the one or more sorted book blocks in a receptacle, as determined using the summed number of pages of the sorted book blocks in the receptacle, wherein the control device is configured to receive the number of pages of the book blocks from a printing system arranged upstream of the sorting device and a standard paper thickness stored in the memory; maximum height of a stack formed by the one or more sorted book blocks in a receptacle, as determined from the height of the one or more book blocks encoded in the at least one identification tag; maximum time reached since inserting the first book block into a receptacle; last book block of a predetermined job stored in the memory being inserted into a receptacle; arriving of a book block from the first input conveyor being of a larger size than the size of the topmost book block in a receptacle.

In some embodiments, the sorting device comprises a rotating device arranged at the first input conveyor and configured to rotate a book block on the first input conveyor by an angle, preferably 90°, around an axis perpendicular to a conveying plane of the first input conveyor.

By using the rotating device, book blocks can be rotated such that the book blocks are inserted with the spine ahead into the receptacles, if the inserting devices are configured such that the book blocks are inserted to the receptacles in a direction perpendicular to the conveying direction of the first input conveyor. Inserting a book block with the spine ahead provides the advantage of reducing the probability of damage to the book block. The rotating device can therefore be used to change the orientation of the book blocks to be in agreement with the orientation of the inserting devices or the receptacles, respectively. In some embodiments, the rotating device may therefore be configured to rotate the book blocks by another angle, depending on the orientation of the inserting devices or the receptacles, respectively.

The rotating device may in some embodiments be configured to rotate a book block by 180°.

In some embodiments, the rotating device comprises a first guiding plate and a second guiding plate arranged downstream of the first guiding plate, which adjoin each other by forming a stop configured to stop a corner of a book block, with an edge oriented perpendicular to the conveying direction and parallel to the conveying plane. In some embodiments, the first guiding plate and the second guiding plate may not adjoin each other. The second guiding plate may comprise an edge forming a stop configured to stop a corner of a book block. The edge may be oriented perpendicular to the conveying direction or may have a curved orientation.

By stopping a corner of a book block, the book block can be forced to rotate, as the first input conveyor continues to drive the book block along the conveying direction. Providing the rotating device with a first guiding plate and a second guiding plate to rotate the book blocks represents a simple mechanism for rotating book blocks, which may especially be suitable for book blocks with a small planar size.

In some embodiments, the first input conveyor is configured to align a book block to the first and/or second guiding plate, preferably by a plurality of rollers controlled by the control device and individually rotatable around a first axis perpendicular to the conveying direction and parallel to a conveying plane of the first input conveyor and individually rotatable around a second axis perpendicular to the conveying direction and perpendicular to the conveying plane of the first input conveyor.

With the plurality of individually controllable rollers, the orientation and/or position of a book block on the first input conveyor can be adapted in a flexible manner.

In some embodiments, the sorting device comprises a transmitting device, wherein the control device is configured to control the transmitting device to transmit a receptacle identification of a receptacle, preferably to a book block further processing system arranged downstream to the first output conveyor.

The transmitting device may transmit information to the book block further processing system by a wired or a wireless connection.

In some embodiments, the sorting device comprises at least one receptacle reader configured to read receptacle identification from a receptacle identification tag of a receptacle and to send the receptacle identification to the control device.

The receptacle tag may for example be a data matrix code, bar code, a QR code, a RFID tag etc. The at least one receptacle reader may accordingly comprise a data matrix code reader, a bar code reader, a QR code reader, a RFID reader etc. The at least one receptacle reader may transmit the receptacle identification to the control device by a wired or a wireless connection.

In some embodiments, the control device is configured to store for each receptacle book block identification information read from the at least one identification tag of a book block filled into the respective receptacle and, if the respective receptacle is full, to control the transmitting device to transmit book block identification information of the one or more book blocks of the respective receptacle, preferably to a book block further processing system arranged downstream to the first output conveyor.

In particular, the transmitting device can transmit the book block identification information together with the receptacle identification, which advantageously allows for improved tracking of the sorted book blocks. Tracking of the sorted book blocks using the receptacle identification and the book block identification information improves the connectability of the sorting device to book block further processing systems and integrability of the sorting device in book production systems.

In some embodiments, the control device is configured to control the transmitting device to further transmit one or more of: sorting information, maximum criterion used to determine a receptacle to be full, number of book blocks in the receptacle derived from the maximum criterion used to determine a receptacle to be full, a sequence or order of the one or more book blocks filled into the receptacle, a time stamp, book block size, job identification, of the one or more book blocks filled into the respective full receptacle, preferably to a book block further processing system arranged downstream to the first output conveyor.

By providing additional information, tracking of the book blocks in the sorting process can further be improved.

In some embodiments, the sorting device comprises a second output conveyor configured to sort out one or more non-productive book blocks from the filling station, wherein the control device comprises a memory having stored thereon a sorting out schedule and is configured to control the inserting devices, and preferably deflectors of the inserting devices, to sort out one or more book blocks with sorting information matching the sorting out schedule to the second output conveyor.

By sorting out non-productive book blocks to the second output conveyor, inserting of non-productive book blocks into the receptacles can be prevented.

The sorting out schedule may for example define an entry in a particular field of the identification tag as the matching sorting information for sorting out of the book block to the second output conveyor. For example, a field entry starting with a "0" may be defined in the sorting out schedule as being a matching sorting information for sorting out of a non-productive book block.

Non-productive book blocks may for example be test book blocks. For example, test book blocks may be produced to test the book production line.

Another example for non-productive book blocks may be quality book blocks used for quality assurance, in particular for a book block further processing system arranged downstream to the sorting device.

In some embodiments, the control device is configured to control the inserting devices, and preferably deflectors of the inserting devices, to sort out error book blocks to the second output conveyor. An error book blocks may for example originate from a jam in the filling station or book books with quality defects. In a further example, an error book block may not carry an identification tag on the topmost page due to a printing interruption. Therefore, the at least one book block reader may not be able to read sorting information and/or book block identification information, and the control device may recognize the book block as an error book block. Additional tracking and/or sequence control or page counting, respectively, in an upstream printing process may be used by the control device to identify an incomplete book block as an error book block, for example if a signature is missing in the book block stack, even if the topmost page may carry an identification tag.

In some embodiments, the at least one book block reader is configured to read book block size information from the at least one identification tag, wherein the control device is configured to control the conveying speed of the first input conveyor and/or the inserting devices, and preferably deflectors of the inserting devices, using the book block size information.

By controlling the speed of the first input conveyor and/or the inserting devices depending on the size of the book blocks conveyed, overloading of the sorting device can be reduced or prevented.

According to a further aspect, the invention is also directed to a method of operating a sorting device according to the present disclosure for sorting book blocks, comprising the steps of: feeding unsorted book blocks to a filling station of the sorting device by a first input conveyor, feeding empty receptacles to the filling station by a second input conveyor, receiving by a control device sorting information of the one ore more book blocks, controlling by the control device a plurality of inserting devices to sort the one or more book blocks into the receptacles using the sorting information.

In some embodiments, the method comprises the step of: reading by the control device sorting information from at least one identification tag of a book block by at least one book block reader.

According to a further aspect, the invention is also directed to a control device for controlling a sorting device according to the present disclosure for sorting book blocks, wherein the control device comprises a computer configured to: receive sorting information of a book block, compare the sorting information with sorting categories defining matching sorting information, assign each of the inserting devices at least one sorting category, select an inserting device with an assigned sorting category to which the sorting information of a book block matches, control the selected inserting device to sort the book block into a receptacle.

In some embodiments, the control device is configured to receive sorting information read from at least one identification tag of a book block by at least one book block reader.

According to a further aspect, the invention is also directed to a computer program product comprising computer program code configured to control a computer of a control device according to the present disclosure such that the computer executes the steps of: receiving sorting information of a book block, comparing the sorting information with sorting categories defining matching sorting information, assigning each of the inserting devices at least one sorting category, selecting an inserting device with an assigned sorting category to which the sorting information of a book block matches, controlling the selected inserting device to sort the book block into a receptacle.

In some embodiments, the computer program code is configured to control the computer of the control device such that the computer receives sorting information read from at least one identification tag of a book block by at least one book block reader.

According to a further aspect, the invention is also directed to a non-transitory computer-readable medium having stored thereon a computer program product according to the present disclosure.

According to a further aspect, the invention is also directed to a book production system comprising a sorting device according to the present disclosure.

In some embodiments, the book production system comprises a book block further processing system arranged downstream to the sorting device, wherein the sorting device is configured to output full receptacles with one or more sorted book blocks to the book block further processing system.

BRIEF DESCRIPTION OF THE DRAWINGS

The present invention will be explained in more detail, by way of exemplary embodiments, with reference to the schematic drawings, in which.

DETAILED DESCRIPTION OF EXEMPLARY EMBODIMENTS

Figure 1:
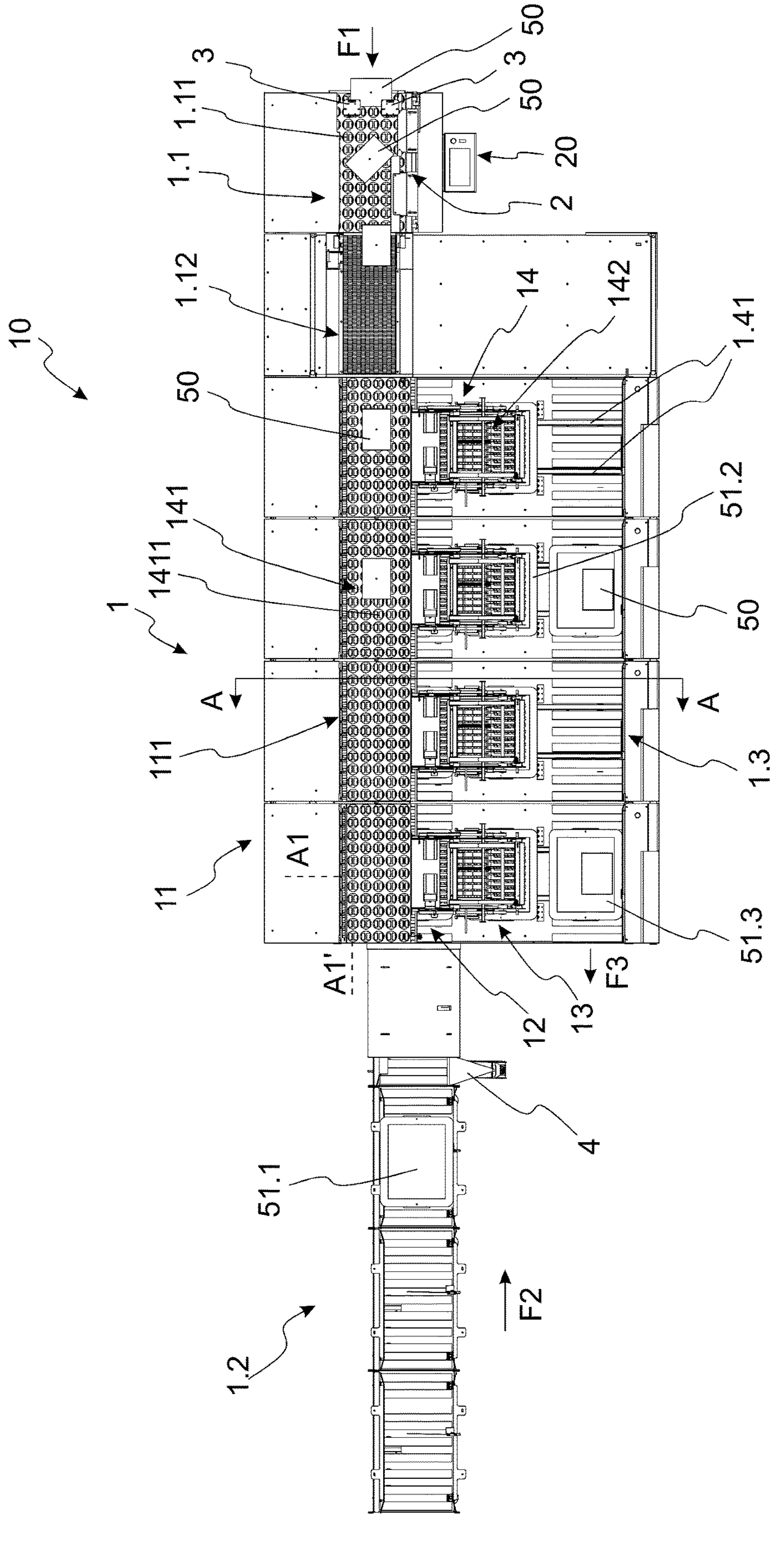
FIG. 1 shows a top view of an embodiment of a sorting device.

FIG. 1 shows a top view of an embodiment of a sorting device 10 comprising a filling station 1 for sorting book blocks 50 into receptacles 51.2. In FIG. 1, the interior of the sorting device 10 is shown, as the sorting device 10 typically comprises hoods covering the interior (see FIG. 5). Book blocks 50 are fed to the filling station 1 on a first input conveyor 1.1. The first input conveyor 1.1 is designed as a roller conveyor comprising a plurality of rollers 1.11 individually rotatable around a first axis perpendicular to the conveying direction F1 of the first input conveyor 1.1 and parallel to the conveying plane of the first input conveyor 1.1. A rotating device 2 is arranged at the first input conveyor 1.1 and configured to rotate the book blocks 50 by 90°. The rotating device 2 is described in more detail further below with regard to FIG. 4. At the first input conveyor 1.1, there are arranged two book block readers 3 configured to read sorting information and/or book block identification information from at least one identification tag of the book blocks 50.

The filling station 1 comprises a feeding section 11 arranged downstream of the first input conveyor 1.1. The feeding section 11 comprises a feeding conveyor 111 adjoining an end portion 1.12 of the first input conveyor 1.1. The end portion 1.12 of the first input conveyor 1.1 is designed as a belt conveyor bridging the roller conveyor portion of the first input conveyor 1.1 with the feeding conveyor 111.

A second input conveyor 1.2 is arranged parallel to the first input conveyor 1.1 and feeds empty receptacles 51.1 to the filling station 1 in the direction F2. An end portion of the second input conveyor 1.2 is partially arranged below the feeding conveyor 111 and feeds the empty receptacles 51.1 onto waiting sites 12 arranged partially below the feeding conveyor 111. Downstream to the waiting sites 12, there are arranged filling sites 13 where the receptacles 51.2 are filled with book blocks 50. Full receptacles 51.3 are transferred from the filling sites 13 to the first output conveyor 1.3 and conveyed away from the filling station 1 along the direction F3. At the second input conveyor 1.2, there is arranged a receptacle reader 4 configured to read receptacle identification information from a receptacle identification tag of the receptacles 51.1 supplied to the filling station 1 by the second input conveyor 1.2.

Four inserting devices 14 are arranged along the feeding conveyor 111. The inserting devices 14 each comprise a deflector 141 arranged on the feeding conveyor 111 and configured to deflect book blocks 50 from the direction F1 to a respective inserting device 14. The inserting devices 14 further each comprise a transfer device 142 comprising a slide configured to transfer deflected book blocks 50 from a deflector 141 to a respective receptacle 51.2. The deflectors 141 comprise a plurality of rollers 1411 controlled by a control device 20 and individually rotatable around a first axis A1 perpendicular to the conveying direction F1 and parallel to the conveying plane of the first input conveyor 1.1. The control device 20 can also be a remotely arranged control device. The rollers 1411 are further also individually rotatable around a second axis perpendicular to the conveying direction F1 and the conveying plane of the first input conveyor 1.1. The second axis therefore points out of the drawing plane of FIG. 1. By rotating of the rollers 1411 around the first axis A1, the book blocks 50 can be conveyed in the conveying direction F1. By rotating of the rollers 1411 around the second axis, the book blocks 50 being positioned on the rotating rollers 1411 can be deflected from the conveying direction F1. In the shown embodiment, the rollers 1411 are rotatable by up to 90° around the second axis. By rotating the rollers 1411 by 90° around the second axis, the first axis A1 is rotated onto the new first axis A1', such that the book blocks 50 lying on the rollers 1411 rotating around the second axis can be deflected from the conveying direction F1 and conveyed into the direction of the transfer devices 142.

Figure 2:
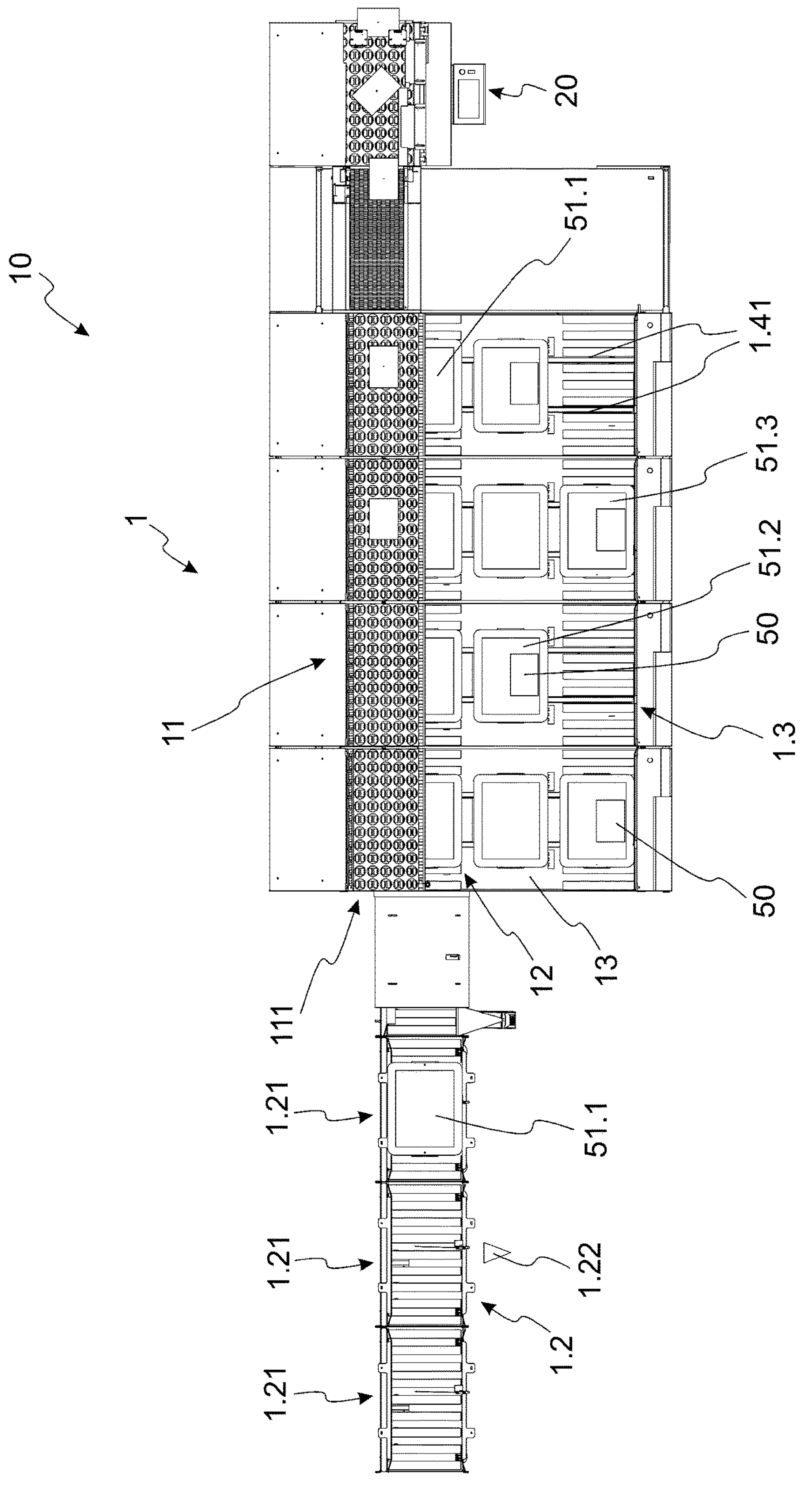
FIG. 2 shows a top view of a part of the sorting device of FIG. 1 without transfer devices.

FIG. 2 shows a top view of the sorting device 10 of FIG. 1 without transfer devices for a better visibility of the waiting sites 12 and filling sites 13 of the filling station 1. The waiting sites 12 are configured to position each an empty receptacle 51.1 received from the second input conveyor 1.2. Each of the waiting sites 12 is arranged upstream to a filling site 13 such that an empty receptacle 51.1 is movable from a waiting site 12 to a filling site 13 if the filling site 13 is unoccupied. Upon moving of an empty receptacle 51.1 to a filling site 13, the resulting unoccupied waiting site 12 can again be occupied by an empty receptacle 51.1 from a neighboring waiting site 12 or from the second input conveyor 1.2. Therefore, it can advantageously be ensured that the waiting sites 12 are always supplied by empty receptacles 51.1, if needed. At the filling sites 13, the receptacles 51.2 are filled by one or more book blocks 50 by the transfer devices. A full receptacle 51.3 or a receptacle satisfying a maximum criterion, respectively, is then moved from a filling site 13 to the first output conveyor 1.3 and can be conveyed away from the filling station 1. The second input conveyor 1.2 comprises pre-waiting sites 1.21 for queueing empty receptacles 51.1. One or more sensors 1.22 are arranged at the pre-waiting sites 1.21 which are configured to notify an operator or the control device 20 if one or more of the pre-waiting sites 1.21 are unoccupied.

Figure 3:
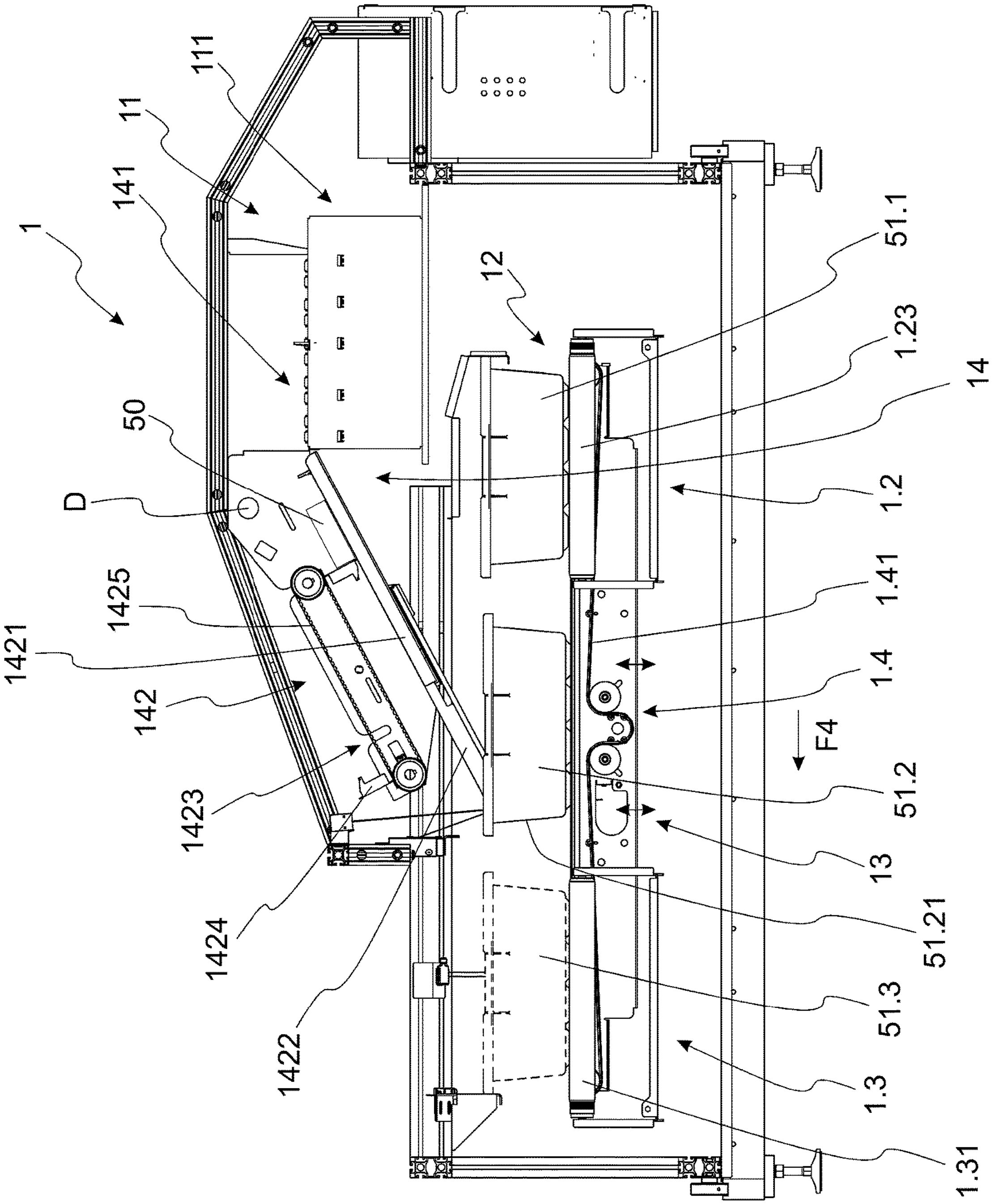
FIG. 3 shows a side cut view of a filling station of the sorting device of FIG. 1 along the line A-A.

FIG. 3 shows a side cut view of the filling station 1 of FIG. 1 along the line A-A. An inserting device 14 with a deflector 141 on the feeding conveyor 111 of the feeding section 11 is shown. The transfer device 142 of the inserting device 14 comprises a slide 1421 with a telescopable end portion 1422. Additionally, the slide 1421 is pivotable around a pivot point D. By pivoting the slide 1421 and telescoping the end portion 1422, the end portion 1422 can at least partially be inserted into the interior of the receptacle 51.2 for inserting one or more book blocks 50 into the receptacle 51.2 and retracted therefrom such that the one or more book blocks 50 are deposited therein. The transfer device 142 further comprises a rake device 1423 arranged above the slide 1421 and pivotable together with the slide 1421. The rake device 1423 comprises two fingers 1423 which are moved in a loop by a belt 1425. The fingers 1423 serve to block a book block 50 at the slide 1421 and to control the sliding movement of the book block 50 along the slide 1421. At the end portion 1422 of the slide 1421, the finger 1423 is turned over such that the book block 50 is released and can slide into the receptacle 51.2. The end portion 1422 and the slide 1421 are configured to deposit a book block 50 with its spine oriented towards a front wall 51.21 of the receptacle 51.2 with respect to the receptacle transfer direction F4. Preferably, the transfer device 142 deposits the one or more book blocks 50 such that the one or more book blocks 50 are aligned and abutting the front wall 51.21 of the receptacle 51.2. Retracting the end portion 1422 from the receptacle 51.2 also allows for transferring of the receptacle 51.2 from the filling site 13 to the first output conveyor 1.3 and of an empty receptacle 51.1 from the waiting site 12 to the filling site 13.

FIG. 3 further shows an empty receptacle 51.1 positioned at a waiting site 12 to which it has been conveyed by rollers 1.23 of the second input conveyor 1.2. The filling station 1 comprises a combined receptacle drive 1.4 configured to convey the receptacle 51.2 from the filling site 13 to the first output conveyor 1.3 if the receptacle 51.2 is full and an empty receptacle 51.1 from the waiting site 12 to the filling site 13. The combined receptacle drive 1.4 comprises two parallel belts 1.41 (only one of the belts are visible in FIG. 3) by means of which the receptacles 51.1, 51.2 can be conveyed in the transfer direction F4. The belts 1.41 of the receptacle drive 1.4 are each arranged between rollers 1.23 and 1.31 of the second input conveyor 1.2 and the first output conveyor 1.3. The receptacle drive 1.4 is configured that the belts 1.41 can be raised above a top level of the rollers 1.23 and 1.31 and lowered onto the top level or slightly below the top level of the rollers 1.23 and 1.31, as indicated by the double arrows at the belt 1.41. By raising the belts 1.41 above the top level of the rollers 1.23 and 1.31, the receptacles 51.1, 51.2 are also raised and can then be conveyed in the transfer direction F4. By lowering the belts 1.41 onto or below the top level of the rollers 1.23 and 1.31, the receptacles 51.1, 51.2 are stationarily positioned in the waiting site 12 or the filling site 13, respectively. Further, a full receptacle transferred from the filling site 13 (as symbolized by the dashed receptacle 51.3) can then be conveyed away from the filling station 1 by the first output conveyor 1.3.

Figure 4:
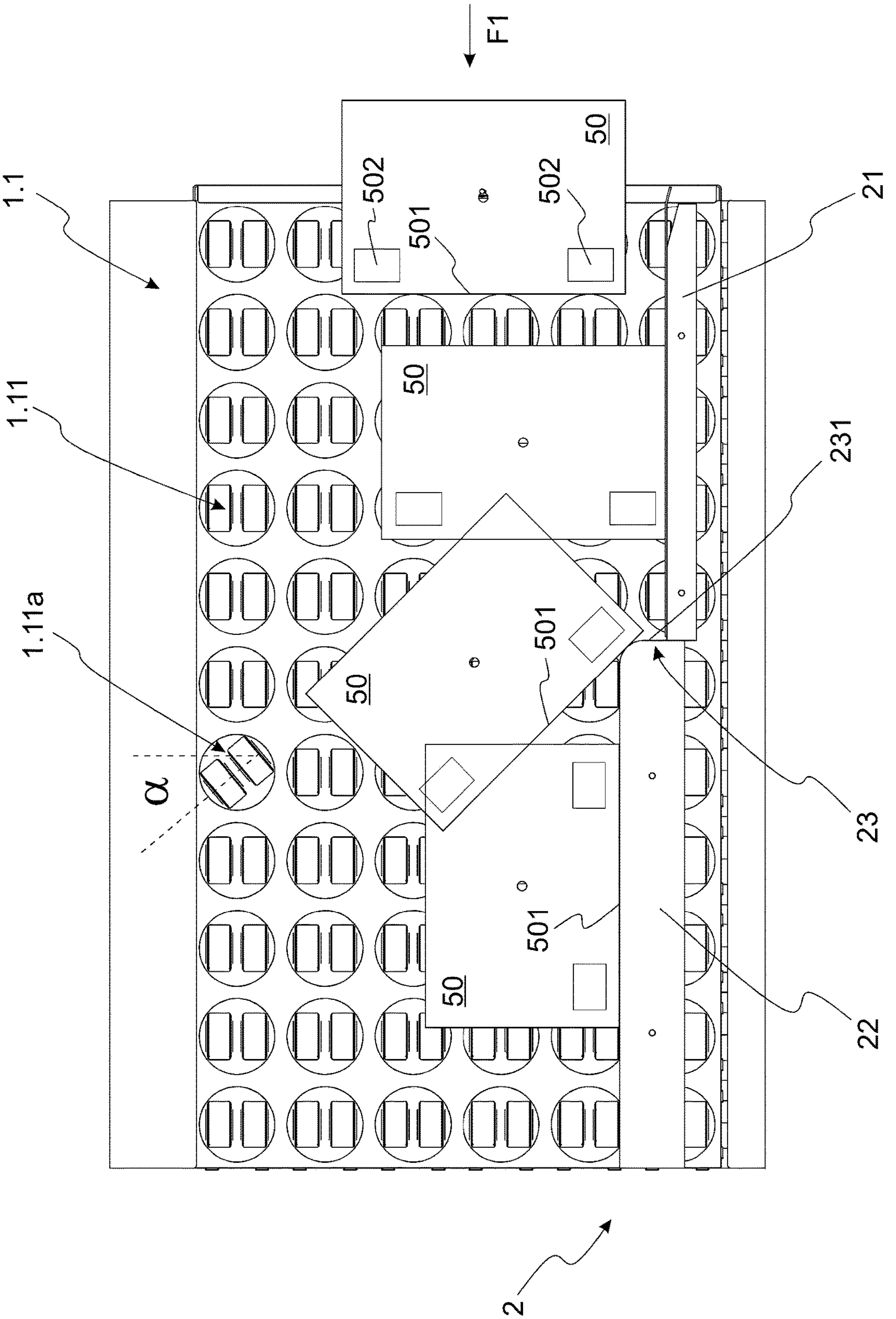
FIG. 4 shows a top view of a rotating device.

FIG. 4 shows a top view of a rotating device 2 arranged at the first input conveyor 1.1. The rotating device 2 is configured to rotate a book block 50 on the first input conveyor 1.1 by 90° around an axis perpendicular to the conveying plane of the first input conveyor 1.1. The rotating device 2 comprises a first guiding plate 21 and a second guiding plate 22 arranged downstream of the first guiding plate 21. The first guiding plate 21 and the second guiding plate 22 adjoin each other by forming a stop 23 with an edge 231 oriented perpendicular to the conveying direction F1 and parallel to the conveying plane of the first input conveyor 1.1.

FIG. 4 illustrates a book block 50 in different stages during rotation, i.e. at different points in time. As shown at the rightmost position, the book block 50 is conveyed on the first input conveyor 1.1 in the conveying direction F1. By using a plurality of rollers 1.11 individually rotatable around a first axis perpendicular to the conveying direction F1 and parallel to the conveying plane of the first input conveyor 1.1 and further individually rotatable around a second axis perpendicular to the conveying direction F1 and perpendicular to the conveying plane of the first input conveyor 1.1, the book block 50 is aligned to the first guiding plate 21. To illustrate the rotatability of the rollers 1.11, exemplary rollers 1.11*a* are shown after being rotated around an angle α around the second axis.

The stop 23 is arranged to stop a corner of the book block 50, which causes the book block 50 to rotate around an axis perpendicular to the conveying plane, as the first input conveyor 1.1 continues to drive the book block 50 in the conveying direction F1. After being rotated by 90°, the book block 50 is aligned to the second guiding plate 22. Before rotating, the book block 50 is conveyed along the conveying direction F1 with the spine 501 running ahead, such that the spine 501 forms the leading edge of the book block 50. After rotating, the spine 501 is aligned parallel to the second guiding plate 22, such that the book block 50 can be deflected with the spine 501 ahead to a transfer device and inserted with the spine 501 ahead into a receptacle by the transfer device.

FIG. 4 further shows book block identification tags 502 arranged at the book blocks 50 from which sorting information and/or book block identification information can be read by one or more book block readers.

Figure 5:
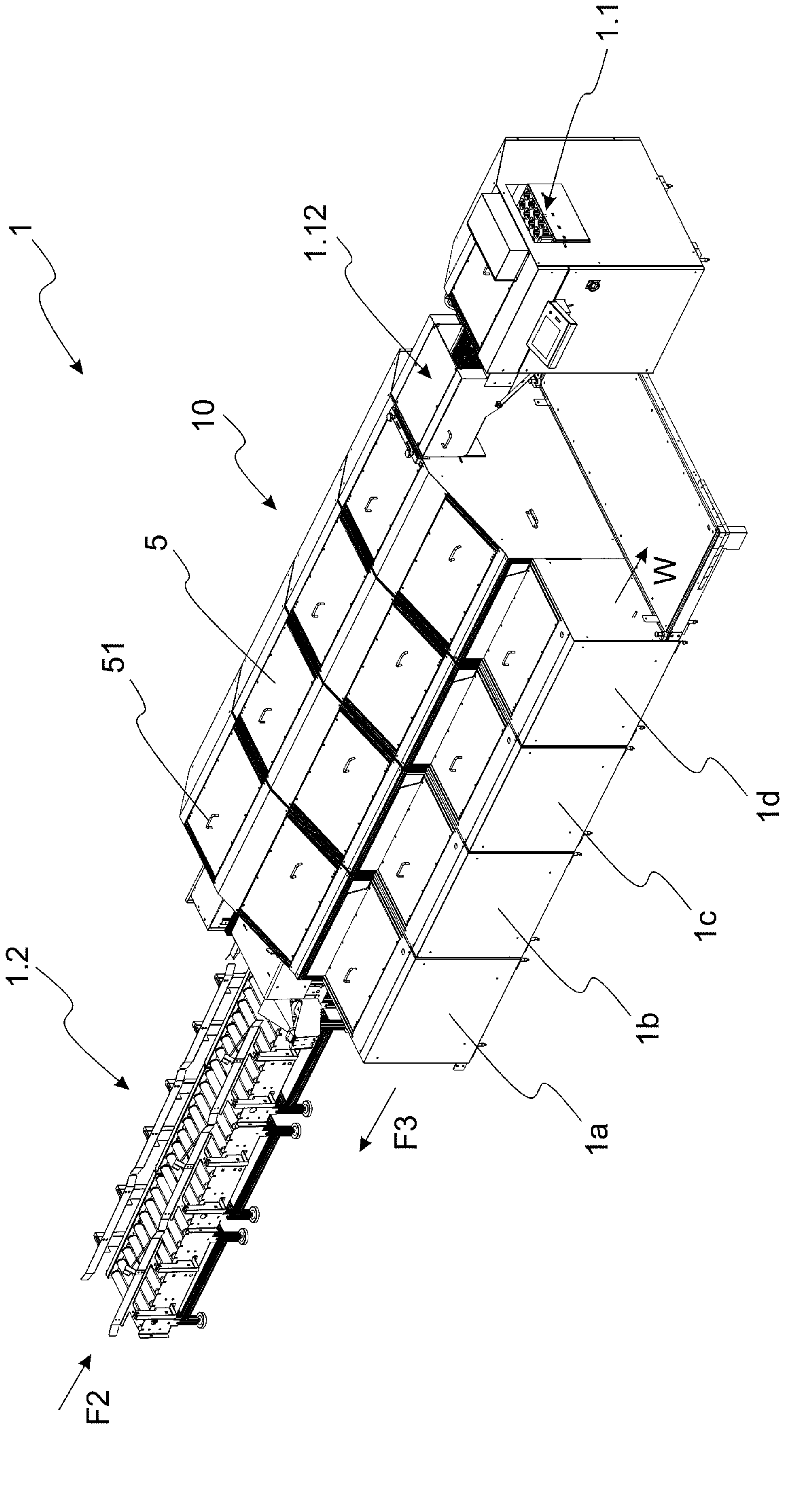
FIG. 5 shows a perspective view of the sorting device of FIG. 1 with hoods.

FIG. 5 shows a perspective view of the sorting device 10 of FIG. 1 with a plurality of hoods 5 covering the interior of the sorting device 10. The hoods 5 comprise handles 51 with which the hoods 5 can be opened to gain access to the interior of the sorting device 10. It can be recognized that the filling station 1 is constructed in a modular fashion with filling station modules 1*a*, 1*b*, 1*c*, 1*d*, wherein each of the filling station modules 1*a*-1*d* comprises an inserting device, a waiting site and a filling site. Each of the filling station modules 1*a*-1*d* are covered by three hoods 5.

The end portion 1.12 of the first input conveyor 1.1 bridging the roller conveyor portion of the first input conveyor 1.1 with the feeding conveyor can be pivoted away, as illustrated by the double arrow. By pivoting away of the end portion 1.12, space is created such that the filling station modules 1*a*-1*d* can be moved along the arrow W. Moving one or more of the filling station modules 1*a*-1*d* along the direction W is used to gain access between the filling station modules 1*a*-1*d* for maintenance of the filling station 1 and the filling station modules 1*a*-1*d*, respectively. The second input conveyor 1.2 configured to supply empty receptacles to the filling station 1 along the direction F2, is illustrated on the left portion of FIG. 5. For better visibility, the first output conveyor configured to convey away full receptacles from the filling station along the direction F3, has been omitted in FIG. 5.

Figure 6:
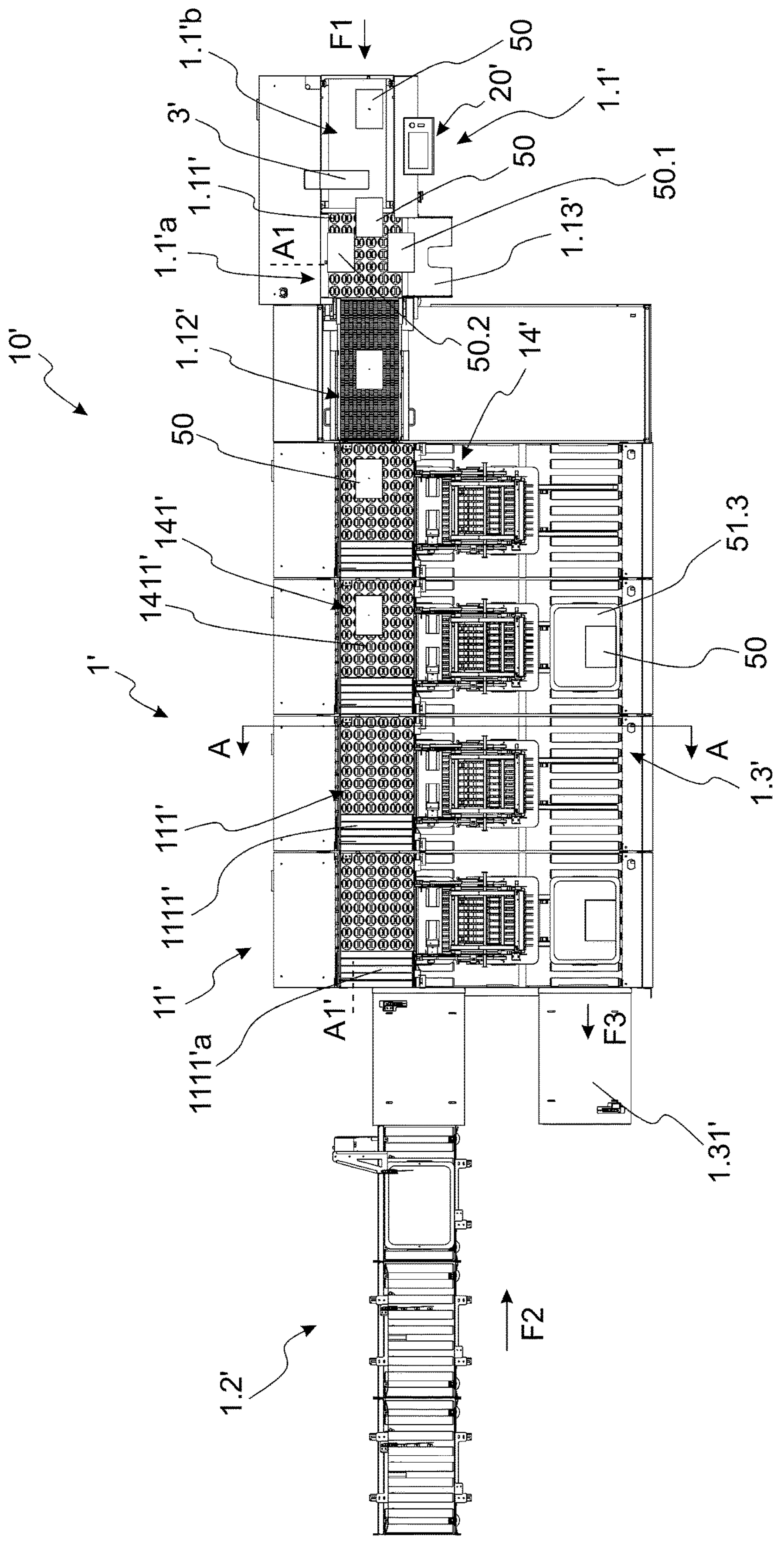
FIG. 6 shows a top view of an embodiment of a sorting device.

FIG. 6 shows a top view of an embodiment of a sorting device 10' comprising a filling station 1' for sorting book blocks 50 into receptacles. The sorting device 10' mostly corresponds to the embodiment of the sorting device 10 as shown in FIG. 1. Compared to the sorting device 10 as shown in FIG. 1, however, the sorting device 10' for example comprises a first input conveyor 1.1' with a roller conveyor 1.1'*a* and a band conveyor 1.1'*b*. Instead of arriving from a de-stacker with an orientation rotated by 90° with respect to the orientation required by the filling station 1', the book blocks 50 arrive as single book blocks with the orientation required by the filling station 1'.

A book block reader 3' is arranged at the band conveyor 1.1'*b* and configured to read pre-sorting information from at least one identification tag of the book blocks 50. The pre-sorting information comprises for example identification information of quality book blocks 50.1 for quality inspection or of test book blocks 50.1. The pre-sorting information may also comprise identification information about incomplete book blocks 50.2.

The roller conveyor 1.1'*a* is arranged downstream to the band conveyor 1.1'*b* and comprises a plurality of rollers 1.11' individually rotatable around a first axis A1 perpendicular to the conveying direction F1 and parallel to the conveying plane of the roller conveyor 1.1'*a*. The rollers 1.11' are further also individually rotatable around a second axis perpendicular to the conveying direction F1 and the conveying plane of the roller conveyor 1.1'*a*. The second axis points out of the drawing plane of FIG. 6. By rotating of the rollers 1.11' around the first axis A1, the book blocks 50 can be conveyed in the conveying direction F1. By rotating of the rollers 1.11' around the second axis, the book blocks 50 being positioned on the rotating rollers 1.11' can be deflected from the conveying direction F1. In the shown embodiment, the rollers 1.11' are rotatable by up to 90° around the second axis. By rotating the rollers 1.11' by 90° around the second axis, the first axis A1 is rotated onto the new first axis A1', such that the book blocks 50 lying on the rollers 1.11' rotating around the second axis can be deflected from the conveying direction F1.

The rollers 1.11' are controlled by a control device 20' which receives pre-sorting information from the book block reader 3' and particularly controls rotation of the rollers 1.11' depending on the pre-sorting information received.

The rollers 1.11' can be rotated clockwise and counter-clockwise around the first axis A1 or the new first axis A1', respectively, such that the book blocks 50 may be deflected and conveyed to both sides of the roller conveyor 1.1'*a* after rotating the rollers 1.11' around the second axis.

For example, quality book blocks and/or test book blocks 50.1 may be deflected to the left side of the roller conveyor 1.1'*a* with respect to the conveying direction F1. The quality book blocks and/or test book blocks 50.1 may then be conveyed to a first output tray 1.13' with the spine ahead. Incomplete book blocks 50.2 may be deflected and conveyed to the right side of the roller conveyor 1.1'*a* with respect to the conveying direction F1, as will be described in further detail below with respect to FIG. 8.

An end portion 1.12' of the first input conveyor 1.11' is designed as a belt conveyor bridging the roller conveyor 1.1'*a* with the feeding conveyor 111'. Four inserting devices 14' are arranged along the feeding conveyor 111'. The inserting devices 14' each comprise a deflector 141' arranged on the feeding conveyor 111' and configured to deflect book blocks 50 from the direction F1 to a respective inserting device 14'. The deflectors 141' comprise a plurality of rollers 1411' corresponding to the rollers 1411 as shown in the embodiment of FIG. 1. At a downstream end of each of the deflectors 141', there is arranged a roller conveyor 1111' comprising cylindrical rollers 1111'*a* for conveying the book blocks 50 in the conveying direction F1 from one inserting device 14' to the next inserting device 14'.

A second input conveyor 1.2' is arranged parallel to the first input conveyor 1.1' and feeds empty receptacles to the filling station 1' in the direction F2. An end portion of the second input conveyor 1.2' is partially arranged below the feeding conveyor 111' and feeds the empty receptacles onto waiting sites arranged partially below the feeding conveyor 111'. Full receptacles 51.3 are conveyed away from the filling station 1' by the first output conveyor 1.3' along the direction F3. At a downstream portion of the first output conveyor 1.3' where the first output conveyor 1.3' emerges from the filling station 1', there is arranged a cover 1.31' for reducing the risk of injury by reaching out into the filling station 1'.

Figure 7:
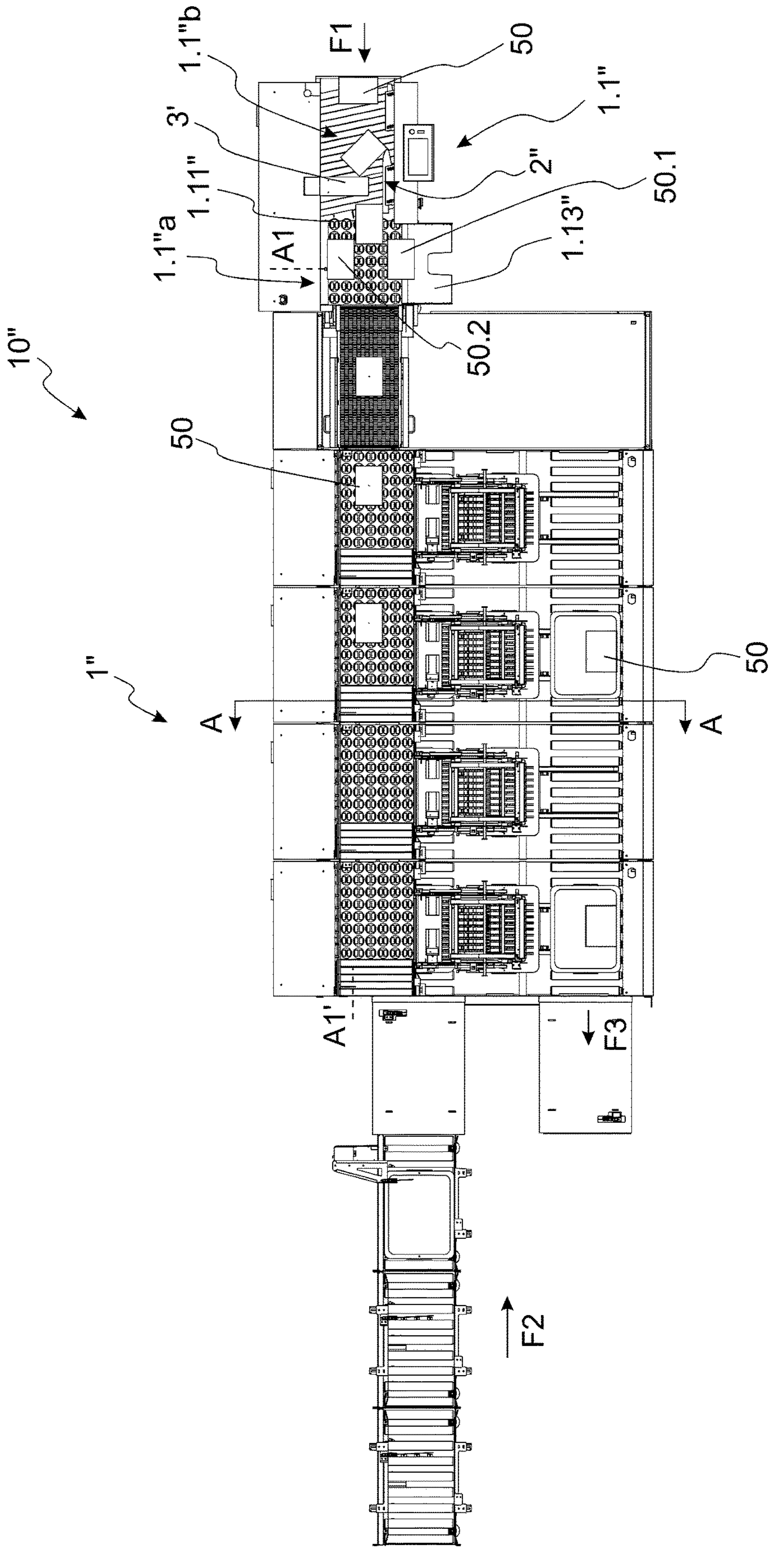
FIG. 7 shows a top view of an embodiment of a sorting device.

FIG. 7 shows a top view of an embodiment of a sorting device 10" comprising a filling station 1" for sorting book blocks 50 into receptacles. The sorting device 10" mostly corresponds to the embodiment of the sorting device 10' as shown in FIG. 6. Compared to the sorting device 10' as shown in FIG. 6, however, the sorting device 10" for example comprises a first input conveyor 1.1" with a first roller conveyor 1.1"*a* and a second roller conveyor 1.1"*b*. The book blocks 50 arrive from a de-stacker with an orientation rotated by 90° with respect to the orientation required by the filling station 1". A rotating device 2" is arranged at the second roller conveyor 1.1"*b*. The rotating device 2" is described in further detail below with respect to FIG. 9.

The first roller conveyor 1.1"*a* comprises a plurality of rollers 1.11" individually rotatable around a first axis A1 perpendicular to the conveying direction F1 and parallel to the conveying plane of the roller conveyor 1.1"*a*, and also individually rotatable around a second axis perpendicular to the conveying direction F1 and the conveying plane of the roller conveyor 1.1"*a*. The first roller conveyor 1.1"*a* is thus designed in correspondence to the first roller conveyor 1.1'*a* as shown in FIG. 6. In particular, the first roller conveyor 1.1"*a* is configured that book blocks 50 can be deflected and conveyed to the left and/or right side of the first roller conveyor 1.1"*a* with respect to the conveying direction F1.

The second roller conveyor 1.1"*b* comprises a plurality of slanted cylindrical rollers 1.11"*b*. Due to the slanted cylindrical rollers 1.11"*b*, the book blocks 50 arriving at the first input conveyor 1.1" are deflected towards the rotating device 2" until being brought into contact with the rotating device 2" and being rotated therethrough.

Figure 8:
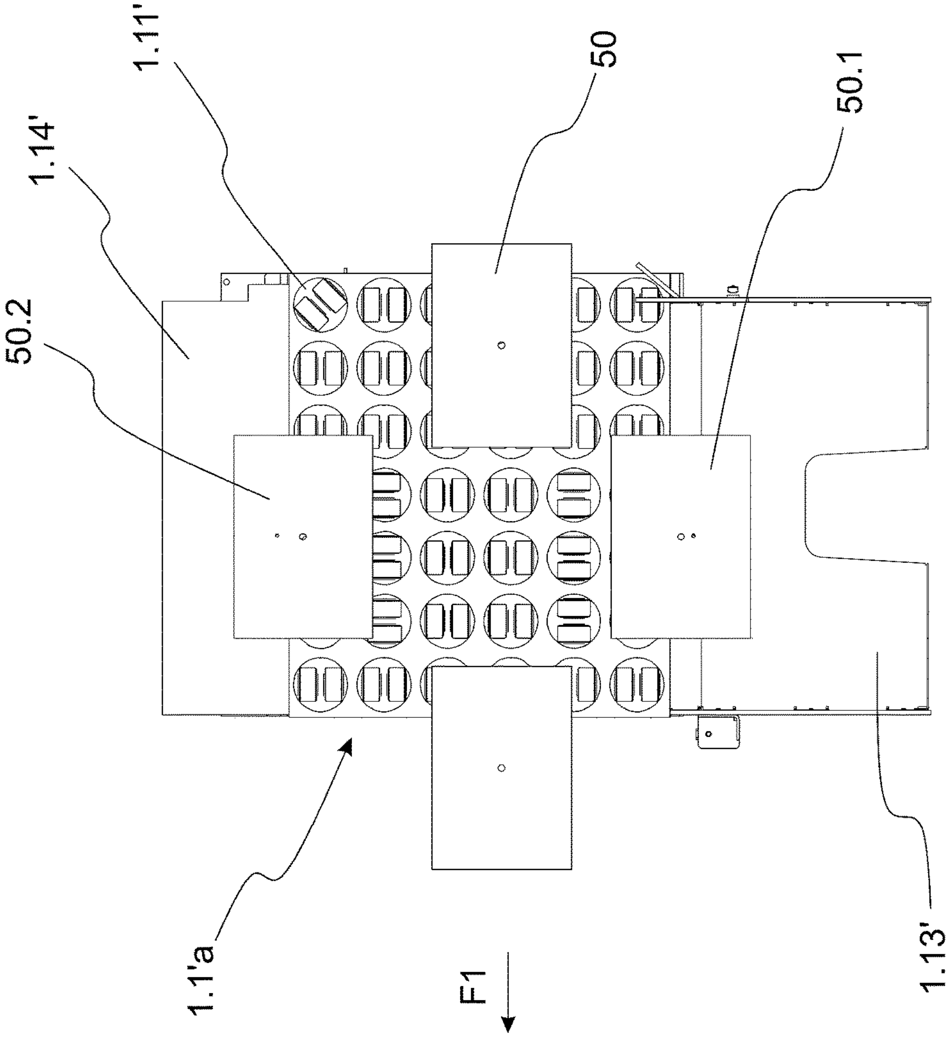
FIG. 8 shows a close-up of the roller conveyor of the first input conveyor as shown in the embodiment of the sorting device in FIG. 6.

FIG. 8 shows a close-up of the roller conveyor 1.1'*a* of the embodiment of the sorting device 10' as shown in FIG. 6. By individually rotating a plurality of the rollers 1.11' around the second axis perpendicular to the conveying plane of the roller conveyor 1.1'*a*, the book blocks 50 can be deflected from the conveying direction F1. In the Figure, one of the rollers 1.11' is shown after being rotated by a certain angle in order to illustrate the rotatability of the rollers 1.11'.

After rotating a plurality of the rollers 1.11' by 90° around the second axis, a book block can be conveyed perpendicular to the conveying direction F1 by rotating the plurality of rollers 1.11' being rotated around the second axis by 90° further around the first axis parallel to the conveying direction F1.

As shown in FIG. 8, a quality book block and/or a test book block 50.1 is conveyed to the left side of the roller conveyor 1.1'*a* with respect to the conveying direction F1 and is received by the first output tray 1.13'. An incomplete book block 50.2 is in turn conveyed to the right side of the roller conveyor 1.1'*a* with respect to the conveying direction F1 and is received by a second output tray 1.14'. The description of the roller conveyor 1.1'*a* can correspondingly be applied for the first roller conveyor 1.1"*a* of the embodiment of the sorting device 1" as shown in FIG. 7.

Figure 9:
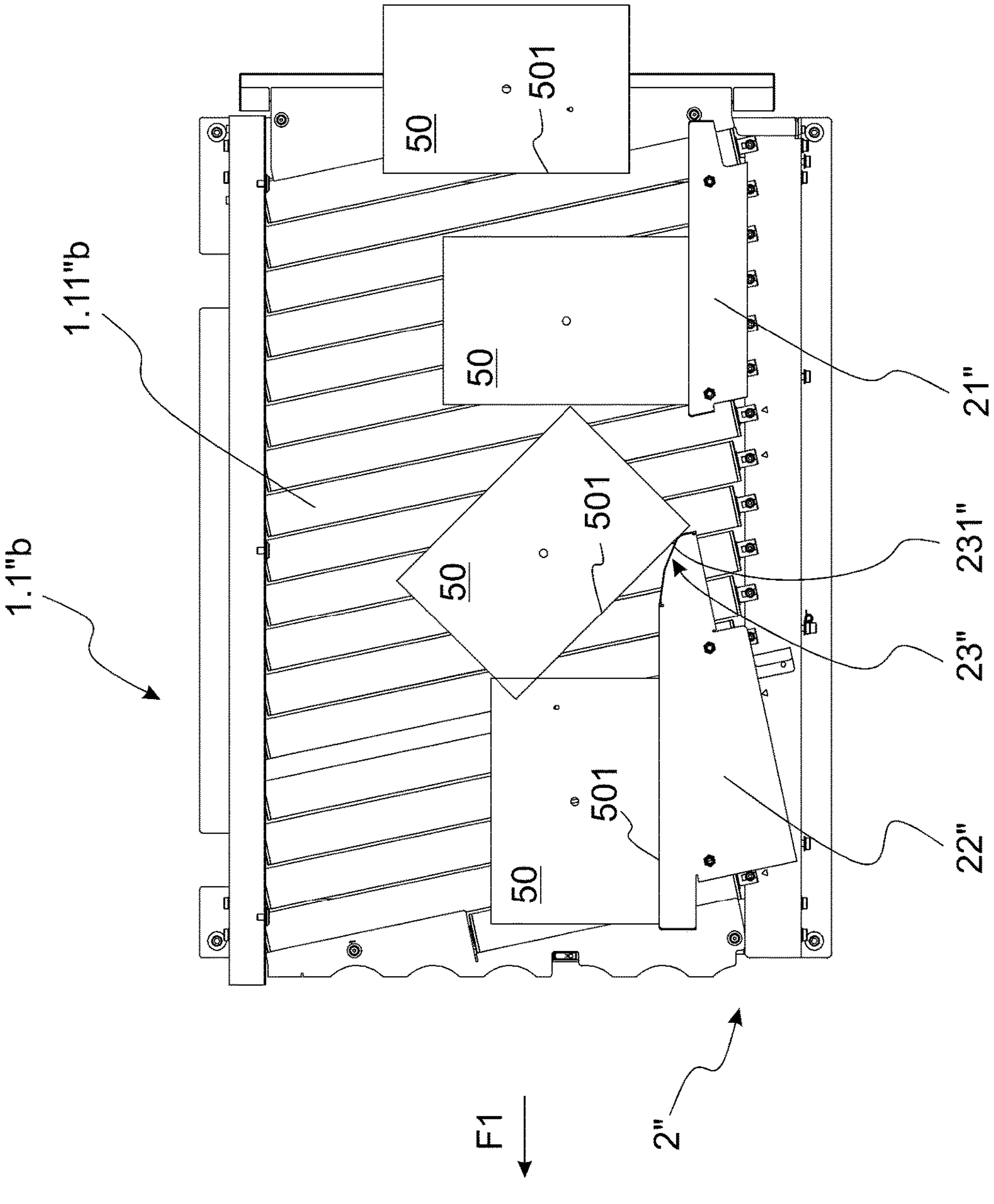
FIG. 9 shows a close-up of the second roller conveyor of the embodiment of the sorting device as shown in FIG. 7.

FIG. 9 shows a close-up of the second roller conveyor 1.1"*b* of the embodiment of the sorting device 10" as shown in FIG. 7 with the rotating device 2" arranged at the second roller conveyor 1.1"*b*. The rotating device 2" is configured to rotate a book block 50 on the second roller conveyor 1.1"*b* by 90° around an axis perpendicular to the conveying plane of the second roller conveyor 1.1"*b*. The rotating device 2" comprises a first guiding plate 21" and a second guiding plate 22" arranged downstream of the first guiding plate 21". The second guiding plate 22" comprises a stop 23" with a curved edge 231".

FIG. 9 illustrates a book block 50 in different stages during rotation, i.e. at different points in time. As shown at the rightmost position, the book block 50 is conveyed on the second roller conveyor 1.1"*b* in the conveying direction F1. Due to the slanted cylindrical rollers 1.11"*b*, the book blocks 50 arriving at the first input conveyor 1.1" are deflected towards the rotating device 2" until being brought into contact with the rotating device 2" and being rotated therethrough. In particular, the book block 50 is aligned to the first guiding plate 21" owing to the slanted cylindrical rollers 1.11"*b* driving the book block 50 towards the first guiding plate 21".

The stop 23" is arranged to stop a corner of the book block 50, which causes the book block 50 to rotate around an axis perpendicular to the conveying plane, as the second roller conveyor 1.1"*b* continues to drive the book block 50 in the conveying direction F1. After being rotated by 90°, the book block 50 is aligned to the second guiding plate 22". Before rotating, the book block 50 is conveyed along the conveying direction F1 with the spine 501 running ahead, such that the spine 501 forms the leading edge of the book block 50. After rotating, the spine 501 is aligned parallel to the second guiding plate 22", such that the book block 50 can be deflected with the spine 501 ahead to a transfer device and inserted with the spine 501 ahead into a receptacle by the transfer device.

Figure 10:
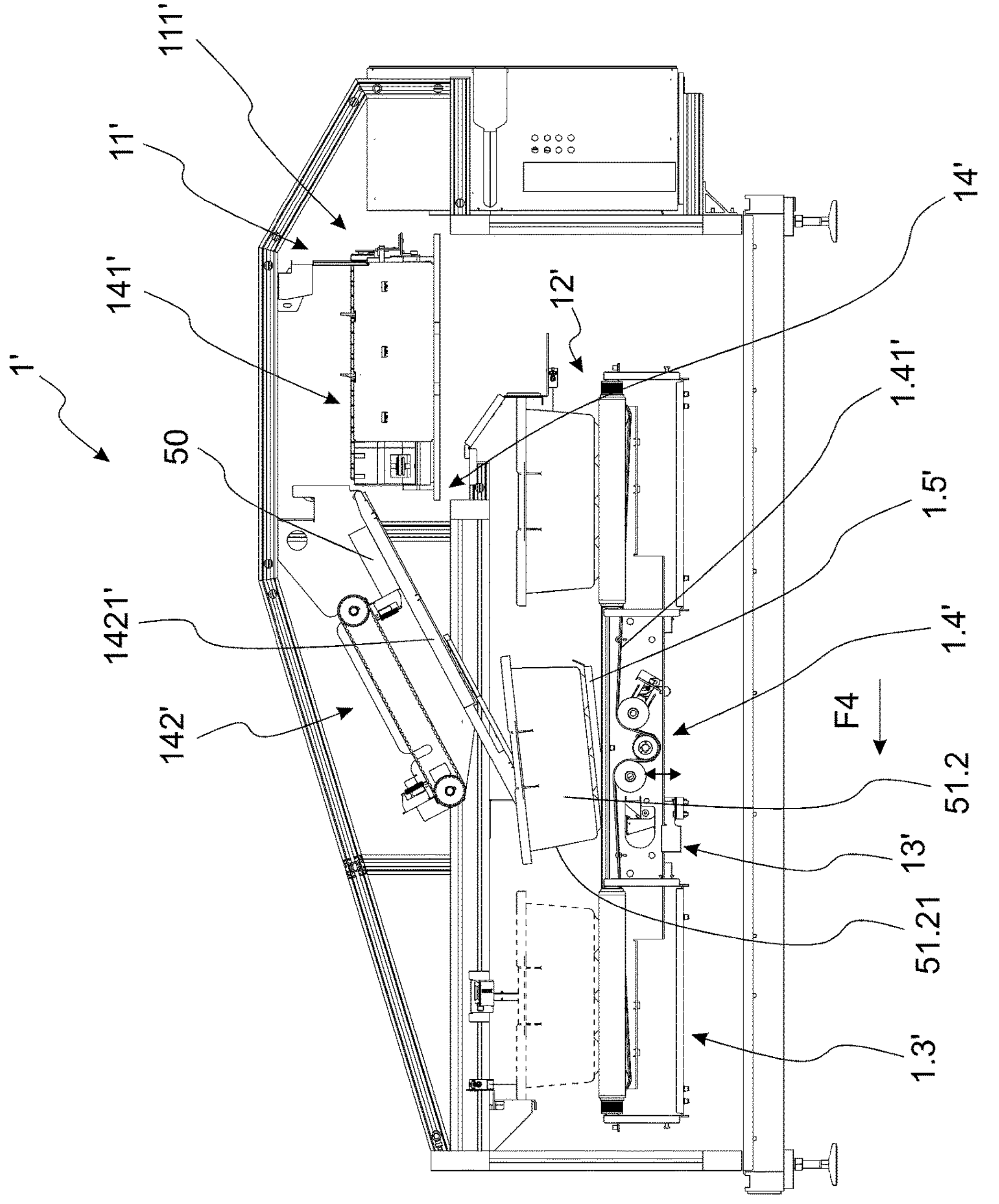
FIG. 10 shows a side cut view of the filling station of the sorting device of FIG. 6 along the line A-A.

FIG. 10 shows a side cut view of the filling station 1' of FIG. 6 along the line A-A. Similar to the embodiment of the sorting device 10 as shown in FIG. 1, an inserting device 14' with a deflector 141' on the feeding conveyor 111' of the feeding section 11' is shown. The transfer device 142' of the inserting device 14' corresponds to the transfer device 142 shown in FIG. 3 and comprises for example also a pivotable slide 1421' with a telescopable end portion for inserting one or more book blocks 50 into the receptacle 51.2. The book block 50 is deposited with its spine oriented towards a front wall 51.21 of the receptacle 51.2 with respect to the receptacle transfer direction F4.

Compared to the embodiment shown in FIG. 3, the filling station 1' comprises a plurality of pivotable lifting plates 1.5' each arranged at the filling sites 13'. The lifting plate 1.5' is configured to be pivoted such that the lifting plate 1.5' forms a slope for the receptacle 51.2. Due to the slope formed by the lifting plate 1.5', a book block 50 being deposited into the receptacle 51.2 can be guided to be aligned and abutting the front wall 51.21 of the receptacle 51.2. In particular for high rates of deposition, book blocks may tend to bounce back from the front wall 51.21 of the receptacle 51.2. By using the lifting plate 1.5', the effects of the bouncing back can be mitigated such that proper alignment of the book blocks in the receptacle 51.2 can be achieved even for high rates of deposition.

After filling of the receptacle 51.2, the lifting plate 1.5' can be pivoted back or lowered, respectively, and the receptacle 51.2 conveyed from the filling site 13' to the first output conveyor 1.3' by using the combined receptacle drive 1.4' and the belts 1.41'. Another empty receptacle is conveyed from the waiting site 12' to the filling site 13' by the combined receptacle drive 1.4' and the belts 1.41', similar as described in connection with FIG. 3.

Figure 11:
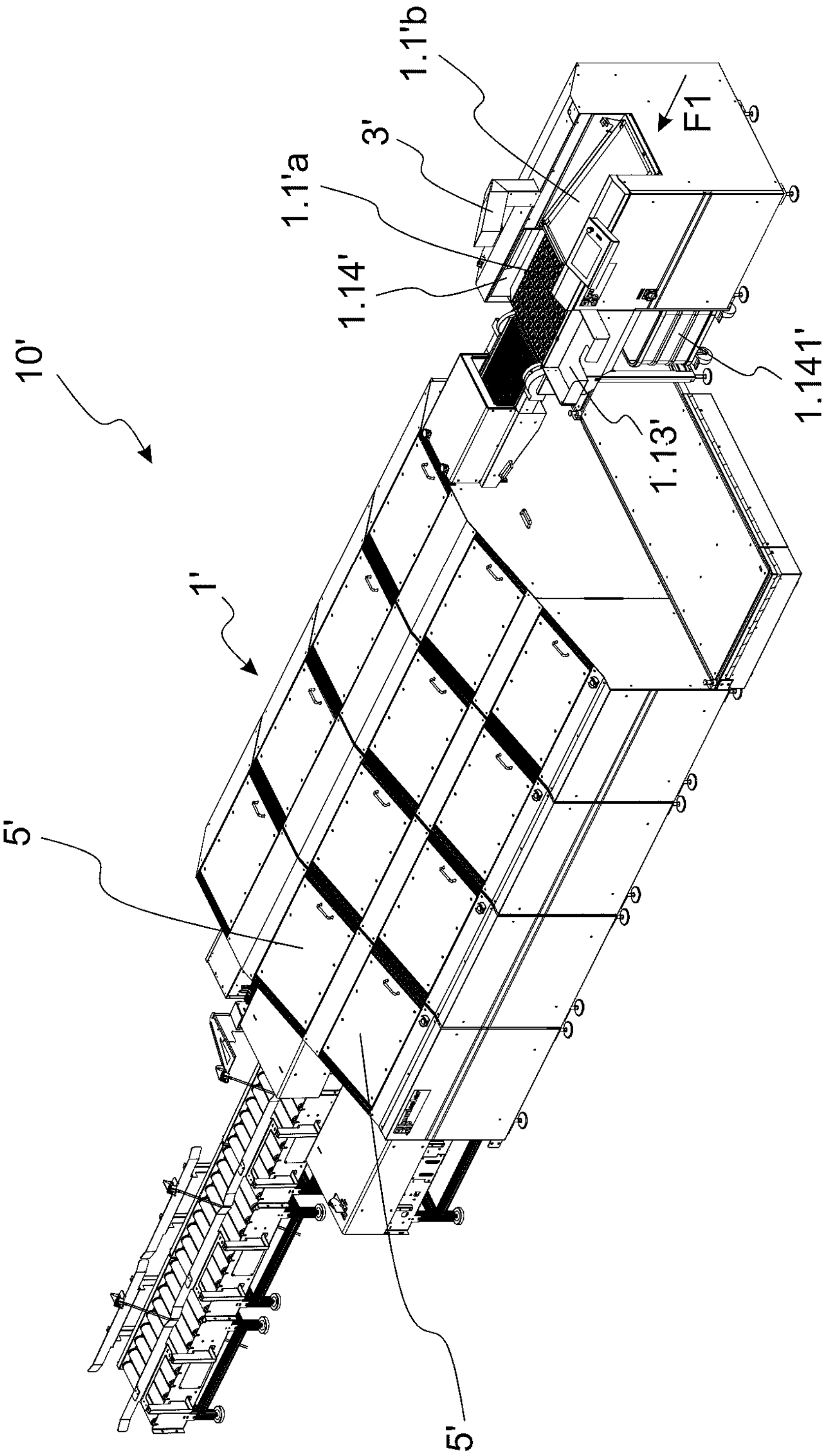
FIG. 11 shows a perspective view of the sorting device of FIG. 6 with hoods.

FIG. 11 shows a perspective view of the sorting device 10' of FIG. 6 with hoods 5' covering the interior of the sorting device 10'. Compared to the embodiment of the sorting device 10 as shown in FIG. 5, it can be recognized that the hoods 5' of the two lateral rows have the same slope. Compared to the sorting device 10, the variety of hood shapes can thus be reduced.

It can also be recognized that the band conveyor 1.1'*b* exhibits a slope towards the roller conveyor 1.1'*a*. As described above in connection with FIGS. 6 and 8, a first output tray 1.13' is arranged on the left side of the roller conveyor 1.1'*a* with respect to the conveying direction F1. On the right side of the roller conveyor 1.1'*a* with respect to the conveying direction F1, a second output tray 1.14' for incomplete book blocks is arranged. The incomplete book blocks received by the second output tray 1.14' drop into an exchangeable container 1.141'. The book blocks are conveyed to the filling station 1', the first output tray 1.13' or to the second output tray 1.14' depending on the pre-sorting information read by the book block reader 3'.

Figure 12:
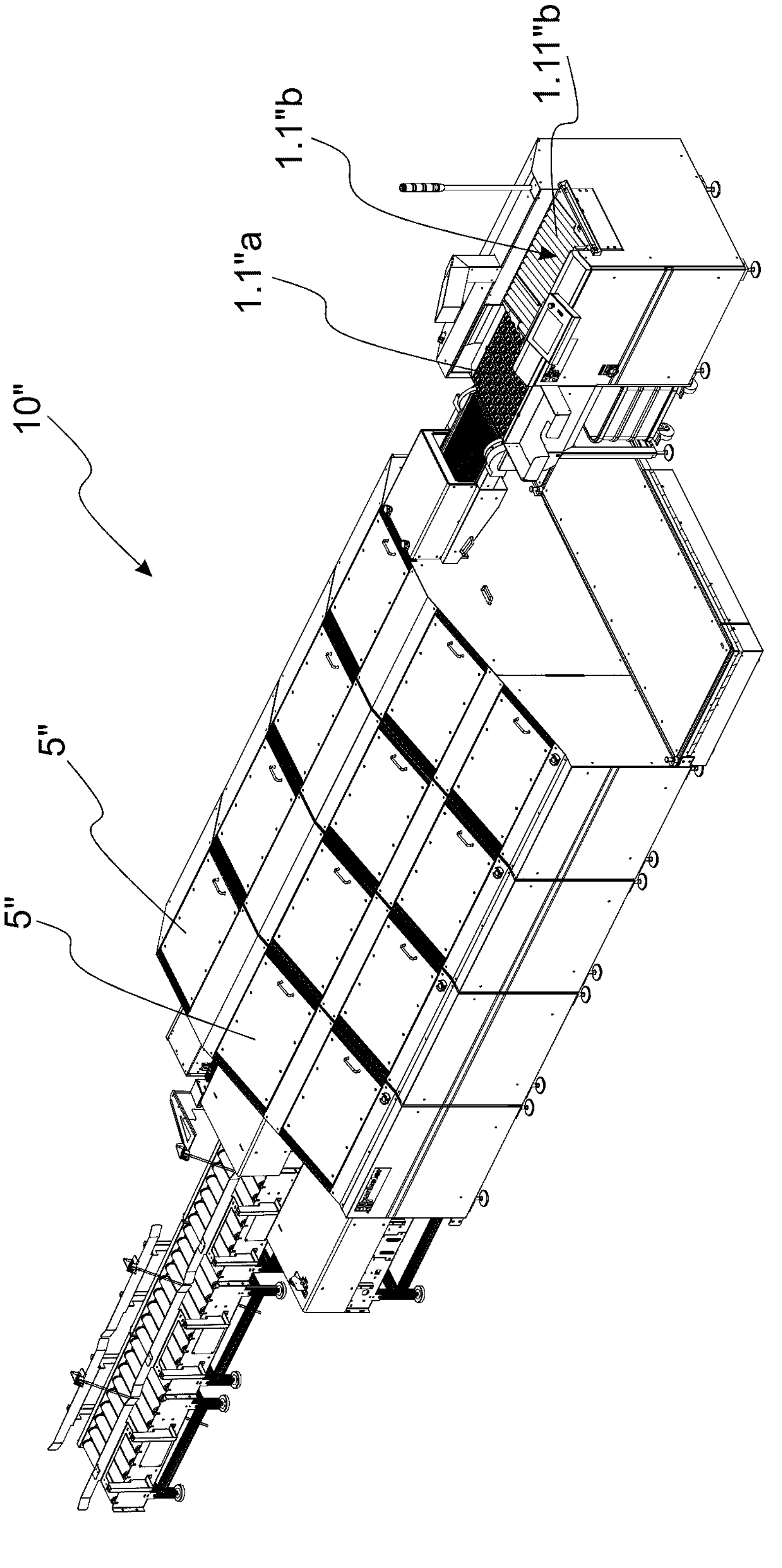
FIG. 12 shows a perspective view of the sorting device of FIG. 7 with hoods.

FIG. 12 shows a perspective view of the sorting device 10" of FIG. 7 with hoods 5" covering the interior of the sorting device 10". The first roller conveyor 1.1"*a* and the second roller conveyor 1.1"*b* with slanted cylindrical rollers 1.11"*b* can be recognized.

The invention claimed is:

1. A sorting device for sorting book blocks, the sorting device comprising a filling station for sorting one or more book blocks into receptacles, the filling station comprising a plurality of inserting devices configured to insert the one or more book blocks into the receptacles, a first input conveyor configured to feed book blocks to the filling station, a second input conveyor configured to feed empty receptacles to the filling station, a first output conveyor configured to transfer full receptacles away from the filling station, a control device configured to receive sorting information of the one or more book blocks and to control the inserting devices to sort the one or more book blocks into the receptacles using the sorting information, and at least one book block reader configured to read sorting information from at least one identification tag of a book block, wherein the control device is configured to receive the sorting information from the at least one book block reader.

2. The sorting device according to claim 1, wherein the control device comprises a memory having stored thereon a sorting category schedule with sorting categories each defining matching sorting information, each of the inserting devices is assigned at least one sorting category, and the control device is configured to select an inserting device with an assigned sorting category to which the sorting information of a book block matches and to control the selected inserting device to sort the book block into a receptacle.

3. The sorting device according to claim 1, wherein the first input conveyor, the second input conveyor and the first output conveyor are arranged in parallel.

4. The sorting device according to claim 1, wherein the filling station comprises a plurality of filling sites arranged in a row along a conveying direction of the first input conveyor, each of the filling sites is arranged at an inserting device and configured to position a receptacle at the filling site such that one or more book blocks are insertable by the respective inserting device into the receptacle positioned at the filling site, the filling station comprises a plurality of waiting sites arranged in a row along a conveying direction of the second input conveyor, configured to position each an empty receptacle received from the second input conveyor, and each of the plurality of waiting sites is arranged upstream to a filling site such that an empty receptacle is movable from a waiting site to a filling site if the filling site is unoccupied.

5. The sorting device according to claim 4, wherein the filling station comprises a plurality of first receptacle drives configured to convey empty receptacles independently from each of the waiting sites to the filling sites and a plurality of second receptacle drives configured to convey full receptacles independently from each of the filling sites to the first output conveyor, and the control device is configured to control the first and second receptacle drives such that conveying of a full receptacle from a filling site to the first output conveyor and conveying of an empty receptacle from a waiting site to a filling site is synchronized.

6. The sorting device according to claim 4, wherein filling station comprises a plurality of combined receptacle drives for each of the waiting sites and/or the filling sites, configured to convey empty receptacles from each of the waiting sites to a respective downstream filling site and to convey full receptacles from each of the filling sites to the first output conveyor.

7. The sorting device according to claim 4, wherein the filling station comprises a plurality of pivotable lifting plates each arranged at the filling sites and each configured to pivot to form a slope for a receptacle positioned at the respective filling site.

8. The sorting device according to claim 1, wherein the inserting devices each comprise a deflector controlled by the control device and configured to deflect one or more book blocks from a conveying direction of the first input conveyor to a respective inserting device, and the deflectors are arranged along a feeding section of the filling station arranged downstream of the first input conveyor.

9. The sorting device according to claim 8, wherein the deflectors comprise a plurality of rollers controlled by the control device and individually rotatable around a first axis perpendicular to a conveying direction and parallel to a conveying plane of the first input conveyor for conveying the book blocks in the conveying direction and individually rotatable around a second axis perpendicular to the conveying direction and perpendicular to the conveying plane of the first input conveyor for deflecting one or more book blocks from the conveying direction.

10. The sorting device according to claim 8, wherein the inserting devices each comprise a transfer device comprising a slide, configured to transfer one or more deflected book blocks from the deflector to the respective receptacle.

11. The sorting device according to claim 10, wherein the transfer devices each comprise an end portion which is at least partially placeable in an interior space of the receptacle and retractable therefrom.

12. The sorting device according to claim 1, wherein the filling station comprises a plurality of ejecting devices controlled by the control device and configured to transfer full receptacles to the first output conveyor.

13. The sorting device according to claim 12, wherein the control device comprises a memory having stored thereon at least one maximum criterion for sorted book blocks in the receptacles, the control device is configured to determine a receptacle to be a full receptacle and to control the ejecting devices to transfer the receptacle to the first output conveyor, if the sorted one or more book blocks in the receptacle satisfy one or more of the at least one maximum criterion, the at least one maximum criterion comprises one or more of: a maximum number of one or more sorted book blocks in a receptacle; a maximum height of a stack formed by the one or more sorted book blocks in a receptacle, as measured by a height sensor of the sorting device; the maximum height of the stack formed by the one or more sorted book blocks in a receptacle, as determined using a summed number of pages of the sorted book blocks in the receptacle, and the control device is configured to receive a number of pages of the book blocks from a printing system arranged upstream of the sorting device and a paper thickness stored in the memory; the maximum height of the stack formed by the one or more sorted book blocks in a receptacle, as determined from the height of the one or more book blocks encoded in the at least one identification tag; a maximum time reached since inserting a first book block into a receptacle; a last book block of a predetermined job stored in the memory being inserted into a receptacle; and arriving of a book block from the first input conveyor being of a larger size than the size of the topmost book block in a receptacle.

14. The sorting device according to claim 1, wherein the sorting device comprises a rotating device arranged at the first input conveyor and configured to rotate a book block on the first input conveyor by an angle, around an axis perpendicular to a conveying plane of the first input conveyor.

15. The sorting device according to claim 14, wherein the rotating device comprises a first guiding plate and a second guiding plate arranged downstream of the first guiding plate, the second guiding plate comprises an edge forming a stop configured to stop a corner of a book block, and the edge is oriented perpendicular to the conveying direction and parallel to the conveying plane or has a curved orientation.

16. The sorting device according to claim 15, wherein the first input conveyor is configured to align a book block to the first and/or second guiding plate by a plurality of rollers controlled by the control device and individually rotatable around a first axis perpendicular to a conveying direction and parallel to a conveying plane of the first input conveyor and individually rotatable around a second axis perpendicular to the conveying direction and perpendicular to the conveying plane of the first input conveyor.

17. The sorting device according to claim 15, wherein the first input conveyor comprises a first roller conveyor and a second roller conveyor, and the first roller conveyor is arranged downstream to the second roller conveyor and the second roller conveyor comprises a plurality of slanted cylindrical rollers.

18. The sorting device according to claim 1, wherein the first input conveyor comprises a roller conveyor and a band conveyor, and the roller conveyor is arranged downstream to the band conveyor.

19. The sorting device according to claim 1, wherein a first output tray is arranged at a first side of the first input conveyor.

20. The sorting device according to claim 1, wherein a second output tray is arranged at a second side of the first input conveyor.

21. The sorting device according to claim 20, wherein the control device is configured to receive pre-sorting information from the book block reader and to control the first input conveyor to convey a book block to the filling station, to the first output tray or the second output tray, depending on the pre-sorting information received.

22. The sorting device according to claim 1, wherein the sorting device comprises a transmitting device, and the control device is configured to control the transmitting device to transmit a receptacle identification of a receptacle to a book block further processing system arranged downstream to the first output conveyor.

23. The sorting device according to claim 22, wherein the sorting device comprises at least one receptacle reader configured to read receptacle identification from a receptacle identification tag of a receptacle and to send the receptacle identification to the control device.

24. The sorting device according to claim 22, wherein the control device is configured to store for each receptacle book block identification information read from the at least one identification tag of a book block filled into the respective receptacle and, if the respective receptacle is full, to control the transmitting device to transmit the book block identification information of the one or more book blocks of the respective receptacle to a book block further processing system arranged downstream to the first output conveyor.

25. The sorting device according to claim 24, wherein the control device is configured to control the transmitting device to further transmit one or more of: sorting information, maximum criterion used to determine a receptacle to be full, number of book blocks in the receptacle derived from the maximum criterion used to determine a receptacle to be full, a sequence or order of the one or more book blocks filled into the receptacle, a time stamp, book block size, job identification, of the one or more book blocks filled into the respective full receptacle, to a book block further processing system arranged downstream to the first output conveyor.

26. A method of operating a sorting device according to claim 1 for sorting book blocks, comprising the steps of: feeding unsorted book blocks to a filling station of the sorting device by a first input conveyor, feeding empty receptacles to the filling station by a second input conveyor, receiving by a control device sorting information of the one or more book blocks, controlling by the control device a plurality of inserting devices to sort one or more book blocks into the receptacles using the sorting information.

27. A book production system comprising the sorting device according to claim 1.

28. A control device for controlling a sorting device comprising a filling station for sorting one or more book blocks into receptacles, the filling station comprising a plurality of inserting devices configured to insert the one or more book blocks into the receptacles, a first input conveyor configured to feed book blocks to the filling station, a second input conveyor configured to feed empty receptacles to the filling station, a first output conveyor configured to transfer full receptacles away from the filling station, a control device configured to receive sorting information of the one or more book blocks and to control the inserting devices to sort the one or more book blocks into the receptacles using the sorting information, and at least one book block reader configured to read sorting information from at least one identification tag of a book block, the control device comprising a computer configured to:

receive sorting information of a book block from the at least one book block reader, compare the sorting information with sorting categories defining matching sorting information, assign each of the inserting devices at least one sorting category, select an inserting device of the inserting devices with an assigned sorting category to which the sorting information of a book block matches, and control the selected inserting device to sort the book block into a receptacle.

29. A non-transitory computer-readable medium having stored thereon computer program product comprising computer program code configured to control a computer of a control device for controlling a sorting device comprising a filling station for sorting one or more book blocks into receptacles, the filling station comprising a plurality of inserting devices configured to insert the one or more book blocks into the receptacles, a first input conveyor configured to feed book blocks to the filling station, a second input conveyor configured to feed empty receptacles to the filling station, a first output conveyor configured to transfer full receptacles away from the filling station, a control device configured to receive sorting information of the one or more book blocks and to control the inserting devices to sort the one or more book blocks into the receptacles using the sorting information, and at least one book block reader configured to read sorting information from at least one identification tag of a book block such that the computer executes:

receiving sorting information of a book block, comparing the sorting information with sorting categories defining matching sorting information, assigning each of the inserting devices at least one sorting category, and selecting an inserting device with an assigned sorting category to which the sorting information of a book block matches, controlling the selected inserting device to sort the book block into a receptacle.

* * * * *